(12) United States Patent
Imhof et al.

(10) Patent No.: US 8,855,987 B2
(45) Date of Patent: Oct. 7, 2014

(54) METHOD FOR OPTIMIZATION WITH GRADIENT INFORMATION

(75) Inventors: Matthias Imhof, Katy, TX (US); Kaveh Ghayour, Houston, TX (US); Tao Sun, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 393 days.

(21) Appl. No.: 13/390,010

(22) PCT Filed: Jul. 27, 2010

(86) PCT No.: PCT/US2010/043402
§ 371 (c)(1),
(2), (4) Date: Feb. 10, 2012

(87) PCT Pub. No.: WO2011/049654
PCT Pub. Date: Apr. 28, 2011

(65) Prior Publication Data
US 2012/0143575 A1    Jun. 7, 2012

Related U.S. Application Data

(60) Provisional application No. 61/254,383, filed on Oct. 23, 2009.

(51) Int. Cl.
G06G 7/48 (2006.01)
G01V 11/00 (2006.01)
G01V 1/30 (2006.01)

(52) U.S. Cl.
CPC . *G01V 11/00* (2013.01); *G01V 1/30* (2013.01); *G01V 2210/665* (2013.01); *G01V 2210/66* (2013.01); *G01V 2210/661* (2013.01)
USPC .......................... 703/10; 703/2; 703/5; 703/6

(58) Field of Classification Search
None
See application file for complete search history.

(56) References Cited

U.S. PATENT DOCUMENTS 4,935,877 A    6/1990    Koza
5,764,515 A    6/1998    Guerillot et al.
(Continued)

FOREIGN PATENT DOCUMENTS

WO    WO 2008/005690    1/2008
WO    WO 2009/020715    2/2009
WO    WO 2009/138290    11/2009

OTHER PUBLICATIONS

M. Sambridge, Geophysical inversion with a neighborhood algorithm-I. Searching a parameter space 1999, pp. 479-494.*

(Continued)

*Primary Examiner* — Omar Fernandez Rivas
*Assistant Examiner* — Kibrom K Gebresilassie
(74) *Attorney, Agent, or Firm* — ExxonMobil Upstream Research Company Law Dept.

(57) ABSTRACT

A method of improving a geologic model of a subsurface region. One or more sets of parameter values are selected. Each parameter represents a geologic property. A cost and a gradient of the cost are obtained for each set. A geometric approximation of a parameter space defined by one or more formations is constructed. A response surface model is generated expressing the cost and gradient associated with each formation. When a finishing condition is not satisfied, at least one additional set is selected based at least in part on the response surface model associated with previously selected sets. Parts of the method are repeated using successively selected additional sets to update the approximation and the response surface model until the finishing condition is satisfied. Sets having a predetermined level of cost to a geologic model of the subsurface region and/or their associated predicted outcomes are outputted to update the geologic model.

25 Claims, 15 Drawing Sheets

(56) References Cited

U.S. PATENT DOCUMENTS

| | | | |
|---|---|---|---|
| 5,844,799 A | 12/1998 | Joseph et al. | |
| 5,995,906 A | 11/1999 | Doyen et al. | |
| 6,070,125 A | 5/2000 | Murphy et al. | |
| 6,151,566 A * | 11/2000 | Whiffen | 703/10 |
| 6,246,963 B1 | 6/2001 | Cross et al. | |
| 6,381,543 B1 * | 4/2002 | Guerillot et al. | 702/13 |
| 6,480,790 B1 | 11/2002 | Calvert et al. | |
| 6,522,973 B1 | 2/2003 | Tonellot et al. | |
| 6,674,432 B2 | 1/2004 | Kennon et al. | |
| 6,754,588 B2 | 6/2004 | Cross et al. | |
| 6,941,255 B2 | 9/2005 | Kennon et al. | |
| 7,006,951 B2 | 2/2006 | Pond, Jr. et al. | |
| 7,027,964 B2 | 4/2006 | Kennon | |
| 7,043,367 B2 | 5/2006 | Granjeon | |
| 7,043,413 B2 | 5/2006 | Ward et al. | |
| 7,046,832 B1 | 5/2006 | Barbour | |
| 7,062,383 B2 | 6/2006 | Deffenbaugh et al. | |
| 7,072,723 B2 | 7/2006 | Kohn et al. | |
| 7,079,953 B2 | 7/2006 | Thorne et al. | |
| 7,117,091 B2 | 10/2006 | Masson et al. | |
| 7,123,258 B2 | 10/2006 | Deny et al. | |
| 7,149,671 B2 | 12/2006 | Lim et al. | |
| 7,216,004 B2 | 5/2007 | Kohn et al. | |
| 7,260,508 B2 | 8/2007 | Lim et al. | |
| 7,292,241 B2 | 11/2007 | Thorne et al. | |
| 7,337,069 B2 | 2/2008 | Masson et al. | |
| 7,340,385 B2 | 3/2008 | James | |
| 7,363,158 B2 | 4/2008 | Stelting et al. | |
| 7,369,973 B2 | 5/2008 | Kennon et al. | |
| 7,392,136 B2 | 6/2008 | Salles et al. | |
| 7,433,784 B2 | 10/2008 | Deffenbaugh et al. | |
| 7,433,785 B2 | 10/2008 | Deffenbaugh et al. | |
| 7,516,055 B2 | 4/2009 | Strebelle | |
| 7,617,082 B2 | 11/2009 | Childs et al. | |
| 7,630,517 B2 | 12/2009 | Mirowski et al. | |
| 7,701,804 B2 * | 4/2010 | Agullo et al. | 367/51 |
| 7,742,875 B2 | 6/2010 | Li et al. | |
| 7,904,248 B2 | 3/2011 | Li et al. | |
| 7,933,757 B2 | 4/2011 | Awwiller | |
| 8,117,019 B2 | 2/2012 | Sun et al. | |
| 8,428,925 B2 * | 4/2013 | Krebs et al. | 703/10 |
| 8,612,195 B2 * | 12/2013 | Sun et al. | 703/10 |
| 8,694,299 B2 * | 4/2014 | Krebs et al. | 703/10 |
| 8,756,042 B2 * | 6/2014 | Tan et al. | 703/10 |
| 2003/0220772 A1 | 11/2003 | Chiang et al. | |
| 2004/0138862 A1 | 7/2004 | Hu et al. | |
| 2005/0102044 A1 | 5/2005 | Kohn et al. | |
| 2006/0041409 A1 | 2/2006 | Strebelle et al. | |
| 2006/0058985 A1 | 3/2006 | Arslan et al. | |
| 2007/0055447 A1 | 3/2007 | Mickaele et al. | |
| 2007/0276604 A1 | 11/2007 | Williams et al. | |
| 2008/0015784 A1 | 1/2008 | Dorn et al. | |
| 2008/0195361 A1 * | 8/2008 | Christensen et al. | 703/2 |
| 2009/0030657 A1 * | 1/2009 | Berg et al. | 703/1 |
| 2009/0157590 A1 | 6/2009 | Mijares et al. | |
| 2009/0164182 A1 | 6/2009 | Pedersen et al. | |
| 2009/0312995 A1 | 12/2009 | Pyrcz et al. | |
| 2010/0018718 A1 * | 1/2010 | Krebs et al. | 166/369 |
| 2011/0000678 A1 * | 1/2011 | Krebs et al. | 166/369 |
| 2011/0288831 A1 * | 11/2011 | Tan et al. | 703/2 |
| 2011/0290478 A1 | 12/2011 | Sun et al. | |
| 2011/0308811 A1 | 12/2011 | Ghayour et al. | |
| 2012/0073824 A1 * | 3/2012 | Routh et al. | 166/369 |
| 2012/0109612 A1 * | 5/2012 | Krebs et al. | 703/10 |
| 2012/0143506 A1 * | 6/2012 | Routh et al. | 702/2 |

OTHER PUBLICATIONS

Gualtiero Böhm, et al., *3D Adaptive Tomography Using Delaunay Triangles and Voronoi Polygons*, Geophysical Prospecting, v48 (2000), pp. 723-744.

Rickwood, et al., *Efficient Parallel Inversion Using the Neighbourhood Algorithm*, Geochemistry Geophysics Geosystems, v7 (2006) Q11001.

M.S. Sambridge, *Geophysical Inversion With a Neighbourhood Algorithm—I. Searching A Parameter Space*, Geophysical Journal International, v138 (1991), pp. 479-494.

M.S. Sambridge, et al., *Seismic Event Location: Nonlinear Inversion Using a Neighbourhood Algorithm*, Pure and Applied Geophysics, v158 (2001), pp. 241-257.

Shang, et al., *Global Optimization for Neural Network Training*, IEEE Computer, v29(3) (1996), pp. 45-54.

Teughels, et al., *Global Optimization by Coupled Local Minimizers and Its Application to FE Model Updating*, Computers and Structures, v81(24-25) (2003), pp. 2337-2351.

Desheng Wang, et al., *Mesh Optimization Based on the Centroidal Voronoi Tessellation*, International Journal of Numerical Analysis and Modeling, v2, Supp., (2005) pp. 100-113.

Badru, (2003), "Well-Placement Optimization Using The Quality Map Approach", A Report Submitted to The Department of Petroleum Engineering of Stanford University, pp. 1-58.

* cited by examiner

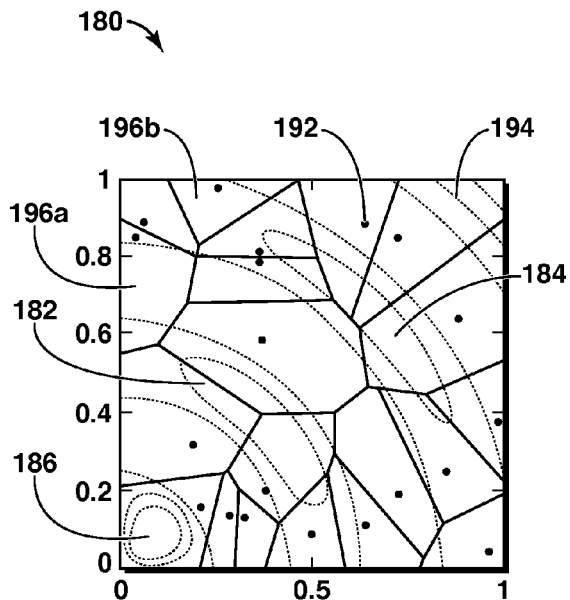
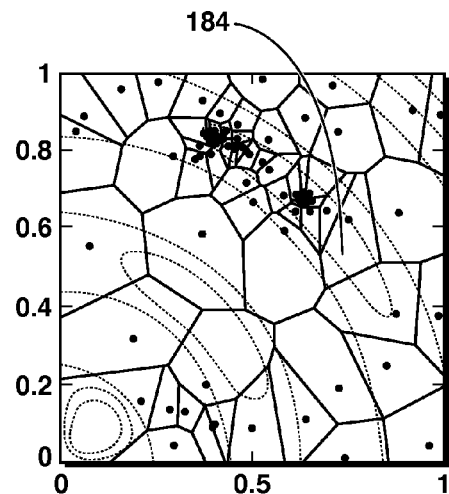
FIG. 19A  FIG. 19B
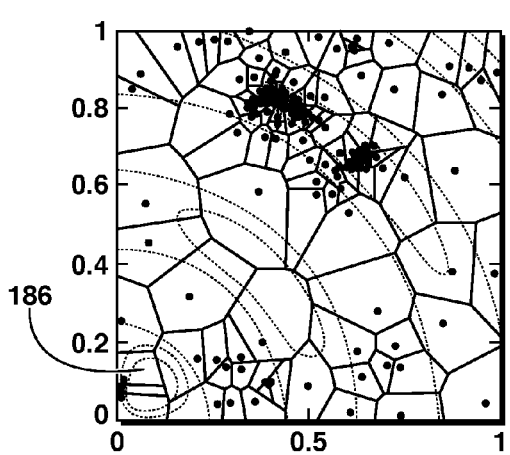
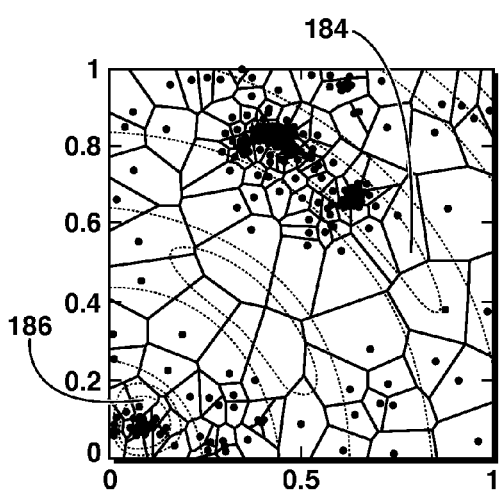
FIG. 19C  FIG. 19D

METHOD FOR OPTIMIZATION WITH GRADIENT INFORMATION

CROSS REFERENCE TO RELATED APPLICATION

This application is the National Stage entry under 35 U.S.C. 371 of PCT/US2010/043402, that published as WO 2011/049654 and was filed on filed 27 Jul. 2010, which claims the benefit of U.S. Provisional Application No. 61/254,383, filed on 23 Oct. 2009, each of which is incorporated herein by reference, in its entirety, for all purposes.

TECHNICAL FIELD

Disclosed aspects relate to numerical optimization where the free parameters of a numerical model are determined such that the resulting prediction is either minimized or maximized.

BACKGROUND OF THE DISCLOSURE

This section is intended to introduce various aspects of the art, which may be associated with aspects of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

Nonlinear optimization problems may arise in many disciplines such as finance, manufacturing, transportation, or the exploration and production of hydrocarbon resources. A basic optimization method for minimizing a particular quantity predicted by a numerical model can be formulated as depicted in FIG. 1, in which the method is indicated at 10. At block 12 a set of model parameter values are chosen. At block 13 the parameter values are run through a numerical model to predict the quantity. At block 14 it is determined whether the quantity is sufficiently minimized or if a prescribed number of iterations is exceeded. If so, the method ends at block 15. Otherwise, new parameter values are chosen at block 12 and the method repeats.

Another optimization method is to compare the outputs of a numerical model with some data or observations. The objective is to find a set of model parameters which maximize the likeness, or minimize the difference, between predictions and observations. This difference is termed the misfit, cost, or cost function. Evaluating the cost function for all possible combinations of parameters defines a response surface. This method, known as inversion, can be considered as finding the response-surface minimum or minima. Applications of inversion in the field of hydrocarbon exploration and production include seismic inversion, geologic modeling, and history matching. FIG. 2 is a flowchart showing a simple known inversion method, indicated generally at 20. At block 22 a set of model parameter values are chosen. At block 23 the parameter values are run through a numerical model to provide a prediction of the output, shown at block 24. The prediction is compared with observed characteristics or data, shown at block 25, to create a cost function. At block 26 it is determined whether the cost function is sufficiently minimized. If so, the method ends at block 27. If not, new parameter values are chosen at block 22 and the method repeats.

Because a complex problem such as geologic modeling may have many independent or free parameters, constructing a response surface for a geologic model by evaluating all possible combinations of parameters is rarely possible. Even constructing an approximate response surface by systematic sampling of the parameter space (and thus systematic testing of parameters) typically is prohibitive for more than just a few free parameters sought by the inversion.

Instead, iterative sampling of the parameter space is often performed, and the issue is to select parameter values to be used in the iterative process. One strategy is to find the points in the parameter space where the gradient of the cost function vanishes, or in other words, the points where the response surface is flat. These points show locally maximal or minimal values for the cost function and have either locally maximal or minimal likeness with the observations. At all other points, the gradients are nonzero and denote the direction in which values of the cost function reduce the most, thus indicating the direction towards parameters with lower costs. As shown in the method 30 of FIG. 3, at block 32 an initial set of parameters is chosen, which is equivalent to choosing an initial point on the response surface. At block 34 the numerical model can be used to evaluate the cost function and its gradient. At block 36 new parameter values in the parameter space downhill on the response surface from previous values are chosen when the cost function is not sufficiently minimized. This method can be repeated until a minimum is reached or until the number of iterations exceeds a prescribed limit. Unfortunately for many problems, there exist various minima on the response surface which nearly guarantee that the found solution is not the global optimum but just a local one. In other words, the solution gets trapped in a local minimum.

Another strategy of parameter selection is sampling the response surface and building a response-surface model which guides the parameter selection. This is shown in the method 40 depicted in FIG. 4, in which at block 42 a response-surface model is estimated based on the outputs of the numerical model and the associated cost function. With each iteration, the response-surface model is updated, hopefully leading to a better selection of parameters (at block 44) to be used in the next iteration. Response-surface model methods often recombine the parameters of the currently best solutions or generate new parameters near the currently best ones. In practice, some degree of randomness may be introduced to keep scouting for promising areas of the response surface to reduce the risk of getting stuck in local minima.

Many attempts have been made to solve various problems associated with optimization methods and algorithms. For example, Sambridge (1999) presents a global optimization method which dynamically partitions the parameter space by Voronoi tessellation. However, only the evaluation of the cost function is considered, and there is no proposal to complement the cost function with the cost function gradient. Thus, the response surface is modeled to be piecewise constant.

Rickwood and Sambridge (2006) reveal a modification to the original neighborhood algorithm which is better suited for parallel computing environments. The original algorithm evaluated the parameters and updated the response surface model in batches which synchronized the algorithm and forced periodic pauses to allow all the processors to catch up. The modification removes this barrier, but does not reveal usage of cost function gradients.

U.S. Pat. No. 4,935,877 to Koza presents a non-linear genetic algorithm for solving optimization problems but does not address inclusion of cost function gradient information.

U.S. Pat. No. 7,216,004 B2 to Kohn et al., U.S. Pat. No. 7,072,723 B2 to Kohn et al., and U.S. Patent Publication No. US2005/0102044 to Kohn et al. reveal methods and systems for finding optimal or near optimal solutions for generic optimization problems by an approach to minimizing functions over high-dimensional domains that mathematically model the optimization problems. These methods transform the cost function into systems of differential equations which are solved numerically. What is not disclosed is usage of a response surface model or a discrete approximation of the cost function.

U.S. Patent Publication No. US20030220772 A1 to Chiang et al. discloses an optimization method which finds a plurality of local optima, and then selects the best among them.

Teughels et al. (2003) presents an optimization method which combines global with local optimization but does not reveal the usage of Voronoi or Delaunay tessellation for building a response surface model.

Shang and Wah (1996) present a hybrid optimization method that combines global and local searches to explore the solution space, locate promising regions, and find local minima. To guide exploration of the solution space, it uses the gradients to explore local minima, but pulls out once little improvement is found. The algorithm is based on neural network methodology and does not use an explicit discretization of a cost function.

The foregoing discussion of need in the art is intended to be representative rather than exhaustive. A technology addressing one or more such needs, or some other related shortcoming in the field, would benefit drilling and reservoir development planning, for example, providing decisions or plans for developing a reservoir more effectively and more profitably.

Reference material which may be relevant to the invention, and which may be referred to herein, include the following:

Sambridge, "Geophysical Inversion with a Neighbourhood Algorithm -I. Searching a parameter space," Geophysical Journal International, 138, 479-494, 1999.

Rickwood and Sambridge, "Efficient parallel inversion using the Neighbourhood Algorithm", Geochemistry Geophysics Geosystems, 7, Q11001, doi: 10.1029/2006GC001246, 2006.

Shang and Wah, "Global Optimization for Neural Network Training," IEEE Computer, 29(3), 45-54, 1996.

Teughels et al., "Global optimization by coupled local minimizers and its application to FE model updating," Computers & Structures, 81(24-25), 2337-2351, 2003.

U.S. Pat. No. 4,935,877 to Koza, "Non-linear genetic algorithms for solving problems."

U.S. Pat. No. 7,216,004 B2 to Kohn et al., "Method and system for optimization of general problems."

U.S. Pat. No. 7,072,723 B2 to Kohn et al., "Method and system for optimization of general problems."

U.S. Patent Publication No. US2005/0102044 A1 to Kohn et al., "Method and system for optimization of general symbolically expressed problems, for continuous repair of state functions, including state functions derived from solutions to computational optimization, for generalized control of computational processes, and for hierarchical meta-control and construction of computational processes."

U.S. Patent Publication No. US20030220772 A1 to Chiang et al., "Dynamical methods for solving large-scale discrete and continuous optimization problems."

SUMMARY

A method of improving a geologic model of a subsurface region is disclosed. One or more sets of parameter values are selected. Each parameter directly or indirectly represents a geologic property. Each of the one or more sets of parameter values is inputted into a numerical model to produce a predicted outcome for each set of parameter values. The predicted outcome for each set of parameter values is compared with observations of the subsurface region, with the difference therebetween defined as a cost associated with each set of parameter values. A gradient of the cost associated with each set of parameter values is obtained. A geometric approximation of a parameter space defined by one or more formations is constructed. Each formation corresponds to a set of parameter values for which cost and gradient of the cost have been evaluated. A response surface model based on the geometric approximation is generated. The response surface model expresses the cost and the gradient of the cost associated with each formation. When a finishing condition is not satisfied, an additional set of parameter values is selected based at least in part on the response surface model associated with previously selected sets of parameter values. Parts of the method are repeated using successively selected additional sets of parameter values to update the geometric approximation and the response surface model until the finishing condition is satisfied. At least one of the sets of parameter values having a predetermined level of cost is outputted to a geologic model of the subsurface region. The geologic model is updated, taking into account at least one of the outputted sets of parameter values and/or the corresponding predicted outcome(s).

According to aspects of the disclosed techniques and methodologies, the geometric approximation may be based on interpolation and extrapolation by Voronoi tessellation, and at least one formation may be a polytope. The geometric approximation may be a based on interpolation and extrapolation by Delaunay triangulation, and at least one formation may be a hypertriangle. The finishing condition may be satisfied when a predetermined number of sets of parameter values have been selected, when a predetermined amount of computer runtime has been exceeded, or when a cost less than a predetermined minimum value or greater than a predetermined maximum value has been discovered. Each of the additional sets of parameter values may be selected at least in part by selecting an additional set of parameter values from within a formation having a better cost associated therewith than costs of other formations in the geometric approximation. Each of the additional sets of parameter values may be selected by drawing a number from a probability function. When the number drawn from the probability function is greater than a predefined threshold, an additional set of parameter values may be selected within a formation having the Nth best cost, compared to costs associated with other formations in the geometric approximation, where N is a positive integer. When the number drawn from the probability function is not greater than the predefined threshold, the additional set of parameter values may be selected in a randomly selected formation in the geometric approximation. At least one of the additional sets of parameter values may be selected by performing a random walk within the formation having a better associated cost, as evaluated at the set of parameter values associated therewith, than other formations in the geometric approximation, the random walk being biased by the gradient of the cost associated with the formation. The random walk may use an inverse of an exceedance function to determine a parameter value of the additional set of parameter values. Hydrocarbons may be extracted from the subsurface region based on the updated geologic model. The updated geologic model may be displayed. The gradient of the cost may be obtained using a finite difference method or an adjoint method.

In another aspect, a method of improving a geologic model of a subsurface region is provided. Observations of geologic properties in the subsurface region are obtained. The geologic properties preferably include permeability and/or porosity. One or more sets of parameter values are selected. Each parameter directly or indirectly represents one of the geologic properties. The set of parameter values are inputted into a numerical model to produce a predicted outcome for each set of parameter values. For each set of parameter values a cost is obtained from a difference between the predicted outcome and the observations. A gradient of the cost associated with each set of parameter values is obtained. A geometric approximation of a parameter space defined by one or more formations is constructed. Each formation corresponds to a set of parameter values for which cost and gradient of the cost have been evaluated. A response surface model is generated based on the geometric approximation. The response surface model expresses the cost and the gradient of the cost associated with each formation. When a finishing condition is not satisfied, an additional set of parameter values is selected based at least in part on the response surface model associated with previously selected sets of parameter values. Parts of the method are repeated using successively selected additional sets of parameter values to update the geometric approximation and the response surface model until the finishing condition is satisfied. At least one of the sets of parameter values having a predetermined cost level are outputted to a geologic model of the subsurface region. The geologic model is updated, taking into account the outputted sets of parameter values and/or the associated predicted outcomes.

According to aspects of the disclosed techniques and methodologies, the finishing condition may be that the cost associated with any of the sets of parameter values is less than a minimum cost or greater than a maximum cost, or that a predetermined number of additional sets of parameter values have been selected. The geometric approximation may be a Voronoi tessellation, and the plurality of formations may include polytopes, and a cost function associated with the formation may include a linear model based on the associated cost and the gradient of the cost. The geometric approximation may be a Delaunay triangulation, and the plurality of formations may include hypertriangles. A cost function in the formation may include a function such as a polynomial based on costs and gradients of the costs at vertices of the hypertriangles. At least one of the additional sets of parameter values may be selected within a formation having a better cost, as evaluated at the parameter set associated therewith, than costs associated with other formations in the geometric approximation. At least one of the additional sets of parameter values may be chosen taking into account the gradient of the cost of the formation having the better cost. Selecting at least one of the additional sets of parameter values may include selecting or choosing a set of parameter values having a better cost, as evaluated at the set of parameter values associated therewith, than other formations in the geometric approximation. Selecting an additional set of parameter values may include choosing a set of parameter values within a formation having an $N^{th}$ best cost associated therewith, where N is a positive integer. Selecting one of the additional sets of parameter values may include evaluating a probability function having a random number input. When an output of the probability function is greater than a predefined threshold, the additional set of parameter values may be chosen within a formation having an $N^{th}$ best cost associated therewith, where N is a positive integer. When the output of the probability function is not greater than the predefined threshold, the additional set of parameter values may be chosen in a randomly selected formation in the geometric approximation. Selecting an additional set of parameter values may include performing a random walk within a formation having a better cost, as evaluated at the set of parameter values associated therewith, than other formations in the geometric approximation, where the random walk is biased by the cost and the gradient of the cost associated with the formation. At least some of the selected sets of parameter values may be selected based on best estimates of sets of parameter values having better costs than other sets of parameter values. At least some of the selected sets of parameter values are selected randomly.

In another aspect, a computer program product having computer executable logic recorded on a tangible, machine-readable medium is disclosed. The computer program product may include: code for selecting one or more sets of parameter values, each parameter representing a geologic property of a subsurface region; code for inputting each of the one or more sets of parameter values into a numerical model to produce a predicted outcome for each set of parameter values; code for comparing the predicted outcome for each set of parameter values with observations of the subsurface region, the difference therebetween defined as a cost associated with each set of parameter values; code for obtaining a gradient of the cost associated with each set of parameter values; code for constructing a geometric approximation of a parameter space defined by one or more formations, each formation corresponding to a set of parameter values for which cost and the gradient of the cost have been evaluated; code for generating a response surface model based on the geometric approximation, the response surface model expressing the cost and the gradient of the cost associated with each formation; code for selecting an additional set of parameter values based at least in part on the response surface model associated with previously selected sets of parameter values, said code for selecting an additional set of parameter values being performed when a finishing condition is not satisfied; code for repeating other parts of the code using successively selected additional sets of parameter values to update the geometric approximation and the response surface model until the finishing condition is satisfied; and code for outputting at least one of the sets of parameter values having a predetermined level of cost to a geologic model of the subsurface region. In another aspect, code may be provided for updating the geologic model using the outputted at least one of the sets of parameter values.

In yet another aspect, a method of extracting hydrocarbons from a subsurface region is provided. One or more sets of parameter values is selected. Each parameter represents a geologic property. Each of the one or more sets of parameter values is inputted into a numerical model to produce a predicted outcome for each set of parameter values. The predicted outcome for each set of parameter values is compared with observations of the subsurface region, with the difference therebetween defined as a cost associated with each set of parameter values. A gradient of the cost associated with each set of parameter values is obtained. A geometric approximation of a parameter space defined by one or more formations is constructed. Each formation corresponds to a set of parameter values for which cost and the gradient of the cost have been evaluated. A response surface model is generated based on the geometric approximation. The response surface model expresses the cost and the gradient of the cost associated with each formation. When a finishing condition is not satisfied, an additional set of parameter values is selected based at least in part on the response surface model associated with previously selected sets of parameter values. Parts of the method are repeated using successively selected additional sets of parameter values to update the geometric approximation and the response surface model until the finishing condition is satisfied. At least one of the sets of parameter values having a predetermined level of cost, and/or their associated predicted outcome(s), are used to predict at least one of a presence and a location of hydrocarbons in the subsurface region. Hydrocarbons are managed in the subsurface region based on the predicted presence and/or location.

BRIEF DESCRIPTION OF THE DRAWINGS

The foregoing and other advantages may become apparent upon reviewing the following detailed description and drawings of non-limiting examples of embodiments in which:

FIGS. 19A, 19B, 19C and 19D are graphs showing the outputs of an optimization method using Voronoi tessellation;

Figure 1:
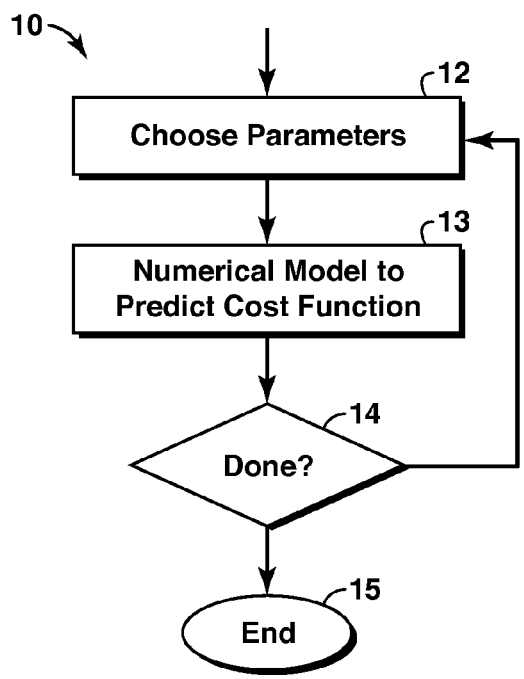
FIG. 1 is a flowchart describing a known optimization method.

To the extent the following detailed description is specific to a particular embodiment or a particular use of the disclosed techniques, this is intended to be illustrative only and not to be construed as limiting the scope of the invention. On the contrary, it is intended to cover all alternatives, modifications and equivalents that may be included within the spirit and scope of the invention, as defined by the appended claims.

DETAILED DESCRIPTION

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "selecting", "inputting", "producing", "comparing", "defining", "associating with", "computing", "constructing", "using", "including", "generating", "expressing", "repeating", "outputting", "updating", "taking into account", "discovering", "evaluating", "displaying", "obtaining", "choosing", "determining", "re-constructing", "predicting", "performing", "managing", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "best cost" refers to a cost that is lower than all other costs that have been evaluated, when a minimum cost is desired. "Best cost" refers to a cost that is higher than all other costs that have been evaluated, when a maximum cost is desired.

As used herein, "better cost" refers to a cost that is lower than other costs, when a minimum cost is desired. "Better cost" refers to a cost that is higher than other costs, when a m maximum cost is desired.

As used herein, "cost" or "cost function" refers to a difference between observations and predictions based on particular sets of parameters.

As used herein, "Delaunay mesh" is a triangular mesh formed by connecting adjacent nodes of Voronoi cells in a Voronoi grid. In a two-dimensional Delaunay mesh, the domain is divided into triangles with the mesh nodes at the vertices of the triangles such that the triangles fill the domain. For the purposes of this disclosure, this domain will be termed the parameter space. Such triangulation is Delaunay when a circle passing through the vertices of a triangle (i.e., a circumcircle) does not contain any other node inside it. In a three-dimensional Delaunay mesh, the domain is divided into tetrahedrons with the mesh nodes at their vertices. In even higher dimensions, the domain is divided into hypertriangles with the mesh nodes at their vertices. A Delaunay mesh/triangulation may be used to generate a Voronoi grid, and a Voronoi grid may be used to generate a Delaunay mesh.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of the reference image. In such an example, the printer may be a printer which has been calibrated through the use of any conventional software intended to be used in evaluating, correcting, and/or improving printing results (e.g., a color printer that has been adjusted using color correction software).

As used herein, "extremum" is a maximum or a minimum. An extremum may be a local extremum, which is a maximum or minimum with respect to neighboring values. An extremum may be a global extremum, which is a maximum or minimum for an entire solution set.

As used herein, a "formation" is a part of a geometric approximation such as a polytope or a hypertriangle.

As used herein, "hydrocarbon reservoirs" include reservoirs containing any hydrocarbon substance, including for example one or more than one of any of the following: oil (often referred to as petroleum), natural gas, gas condensate, tar and bitumen. The term "hydrocarbon reservoirs" also includes reservoirs used for the storage of $CO_2$, for example to enhance the production of hydrocarbons or to sequester $CO_2$.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$.

As used herein, a "hypertriangle" is a generalization of a two-dimensional triangle or a three-dimensional tetrahedron to any number of dimensions. Hypertriangles include but are not limited to two-dimensional triangles and three-dimensional tetrahedra.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein, the terms "optimal," "optimizing," "optimize," "optimality," "optimization" (as well as derivatives and other forms of those terms and linguistically related words or phrases), are not intended to be limiting in the sense of requiring a method or system to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, it is to be understood that these terms are more general. The terms can describe working toward a solution which may be the best available solution, a preferred solution, or a solution that offers a specific benefit within a range of constraints; or continually improving; or refining; or searching for a high point or maximum (or a low point or a minimum) for an objective; or processing to reduce a penalty function or cost function; etc.

As used herein, a "polytope" is a generalization of a two-dimensional polygon to any number of dimensions. As non-limiting examples, a two-dimensional polytope is a polygon, and a three-dimensional polytope is a polyhedron.

As used herein, a "random walk" describes a process of selecting one or more parameter values within a response surface model or a portion thereof, where the selection begins at a known parameter value and, using a degree of randomness, iteratively selects a new parameter value.

As used herein, "response surface" is a combination of cost function values evaluated for a plurality of combinations of parameter values.

As used herein, "rock" includes various geological materials that may be encountered during drilling operations, e.g., salt, clay, shale, sand and the like, in addition to those materials more formally classified as "rocks."

As used herein, "subsurface" means beneath the top surface of any mass of land at any elevation or over a range of elevations, whether above, below or at sea level, and/or beneath the floor surface of any mass of water, whether above, below or at sea level.

As used herein, "tessellation" means a collection of polytopes that fill a possibly multidimensional space with no gaps or overlaps. In two dimensions, for example, a tessellation would consist of a collection of polygons covering a plane. In three dimensions, for example, the tessellation would consist of a collection of polyhedra covering a volume.

As used herein, a "Voronoi cell" is defined as the region of space that is closer to its node than to any other node, where a cell is associated with a node and a series of neighboring cells. A Voronoi grid is made of Voronoi cells. The Voronoi grid is locally orthogonal in a geometrical sense; that is, the cell boundaries are normal to lines joining the nodes on the two sides of each boundary. For this reason, Voronoi grids are also called Perpendicular Bisection (PEBI) grids. A rectangular grid block, or Cartesian grid is a special case of the Voronoi grid. The Voronoi grid has the flexibility to represent widely varying domain geometry, because the location of nodes can be chosen freely. Voronoi grids are generated by assigning node locations in a given domain and then generating cell boundaries in a way such that each cell contains all the points that are closer to its node location than to any other node location.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Figure 2:
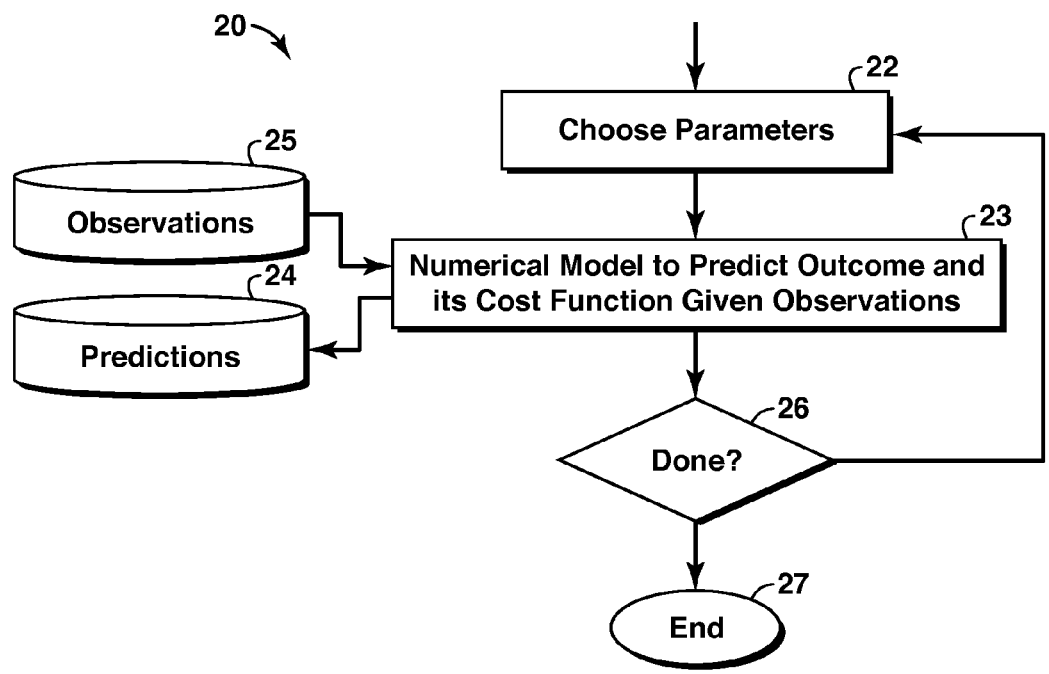
FIG. 2 is a flowchart describing a known optimization method.
Figure 3:
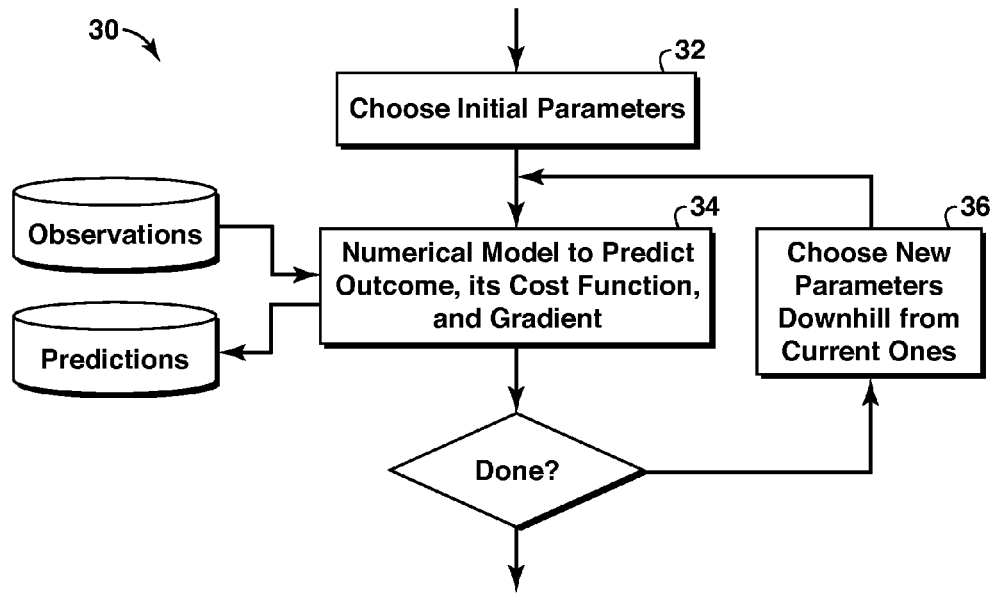
FIG. 3 is a flowchart describing a known optimization method.
Figure 4:
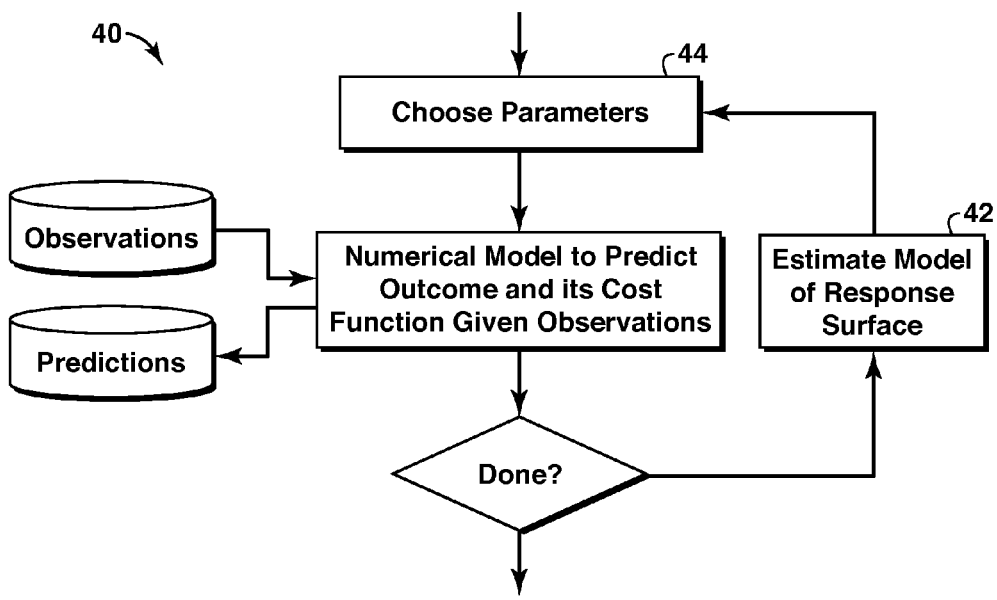
FIG. 4 is a flowchart describing a known optimization method.

The known optimization methods described previously may be classified as global or local methods. Global optimization methods, such as those shown in FIGS. 1 and 2, sample the parameter space through a guided trial-and-error procedure where all the previously tried parameters and the resulting cost functions are used to predict a hopefully better set of parameters to be used in the next evaluation of the numerical model to increase likeness and thus to decrease the cost function. Local optimization methods, such as those shown in FIGS. 3 and 4, seek to steadily reduce the cost function by analytical or approximate evaluation of the cost function gradient which allows moving or marching down along the cost function surface to an extremum (such as a minimum). In one aspect of the inventive method, local optimization methods use a finite difference method and/or an adjoint method to determine or obtain the cost function gradient. Local optimization methods usually require that the starting point for optimization be close to an extremum. Because this extremum is most likely a local extremum, local optimization methods usually will not find a global extremum.

Figure 5:
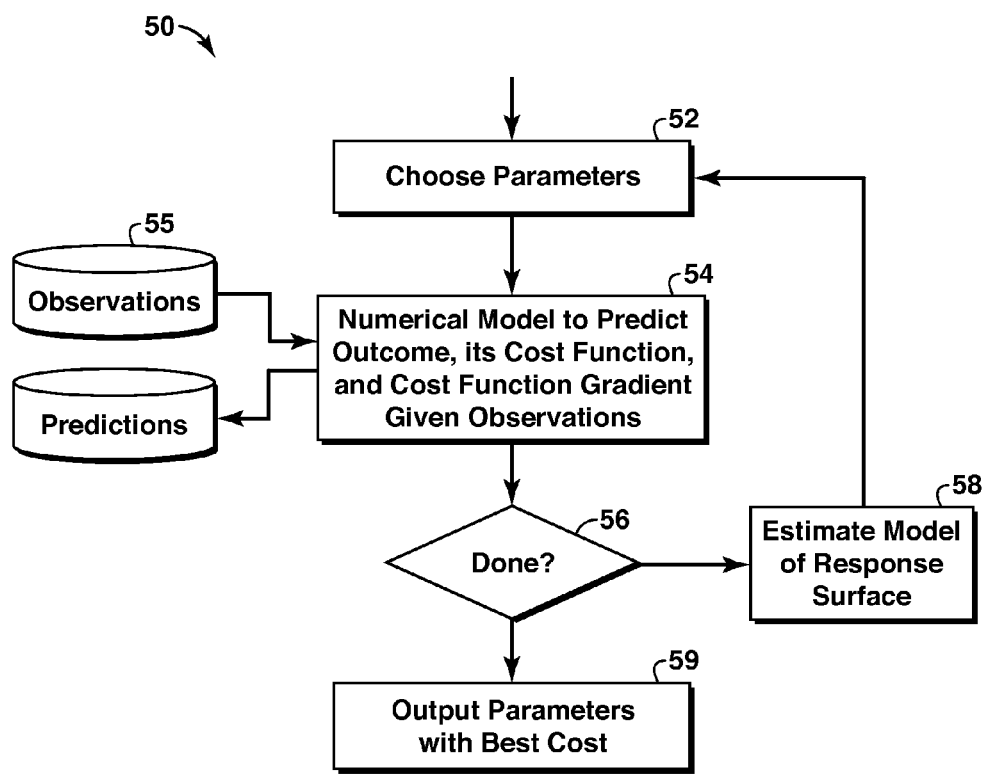
FIG. 5 is a flowchart describing an optimization method.

According to disclosed techniques and methodologies, a guided trial-and-error method for nonlinear optimization is described for the case where a numerical model not only predicts an associated cost or cost function, but also the gradient of the cost or cost function with regard to the sought after parameters, i.e., the direction towards locally better parameters. The method combines a global optimization method with a local optimization method, which reduces the number of model evaluations and thus the computational costs of optimizing a complex, potentially nonlinear problem. This is shown in a general sense in the method 50 shown in FIG. 5. After values for parameters are chosen at block 52, at block 54 a numerical model is applied to predict or obtain an outcome as well as an associated cost and a gradient of the cost, based on observations of a subsurface region, which are stored at 55. At block 56 it is determined whether the values of the parameters describe a location on the response surface that is adequately minimized or maximized, or if a prescribed number of iterations is exceeded. If not, a model of the response surface is estimated at block 58, and the method returns to block 52 to choose a new set of parameter values based on the estimated model of the response surface. Method 50 repeats until, at block 56, it is determined whether the set of parameter values describe a location on the response surface that is adequately minimized or maximized, or if a prescribed number of iterations is exceeded. If so, at block 59 the set of parameter values having the best cost is outputted. In one aspect, the set of parameter values having the best associated cost is outputted to update a geologic model of the subsurface region. This may be done to predict the presence and/or location of hydrocarbons in the subsurface region, so that hydrocarbon extraction activity may be performed on the subsurface region. In another aspect, multiple sets of parameter values having associated costs better than other sets are outputted to update the geologic model. This may be done to provide multiple parameter sets for further optimization processes, which are not discussed here in detail. Further, sets of parameter values and their costs may be outputted for further analysis, for example the estimation of sensitivity or uncertainty, or the estimation or updating of statistics such as the posterior probability densities.

A disclosed aspect may be described mathematically as follows. Assume a forward model or numerical model L which uses a set of independent or free parameters x to make some predictions p. The relationship between parameters, the forward model and the predictions may be written as $L(x)=p$. If data or observations d are available, a cost function C, which measures the difference between predictions and observations, may be evaluated. The cost function may be defined as $C(x)=C(p(x), d)=|p(x)-d|$, which defines a discrete point in a multidimensional space formed by the parameters x and the cost function $C(x)$. A response surface $R(x)$ forms a surface in this multidimensional space. Since it is seldom possible to compute the response surface explicitly, it may be approximated or modeled, for example, by interpolation from a few sample computations of the cost function $C(x)$. The expression $r(x)$ denotes the model of the response surface obtained from the sample computations of the cost function $C(x)$. Lastly, the cost function gradient or adjoint is defined as $a(x)=\nabla C(x)$. Evaluating the numerical model with a set of parameters provides not only a value for the cost function, but also for the cost function gradient $a(x)$, thus permitting the response surface to be defined or modeled locally by its Taylor expansion $r(x')=C(x)+a(x)(x'-x)$. Thus, the selection of new parameters, or an additional point on the response surface or in the parameter space, may be biased towards a lower cost function value.

Figure 6:
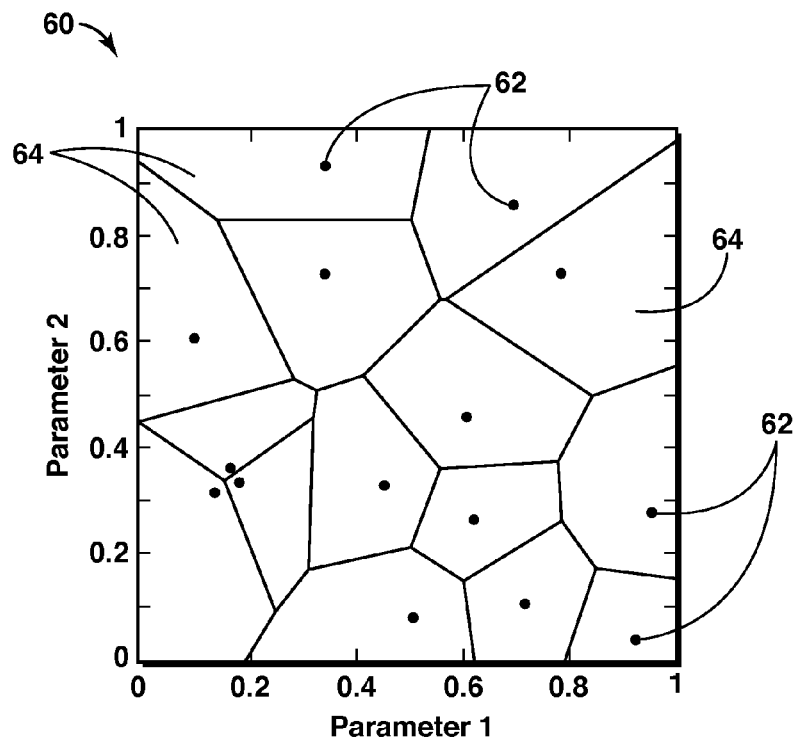
FIG. 6 is a graph showing a two-dimensional Voronoi tessellation.
Figure 7:
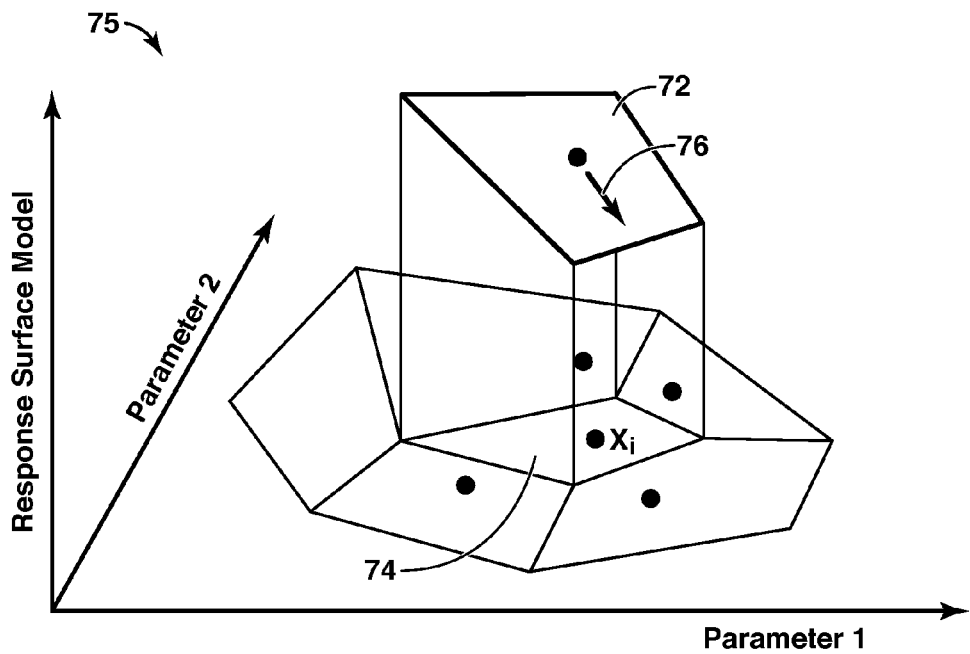
FIG. 7 is a graph showing a polytope with an associated response surface model.

A Voronoi tessellation of the parameter space may be used to model the response surface. In a Voronoi tessellation, each polytope represents the region of influence around each of a given set of points. FIG. 6 depicts a two dimensional example of a Voronoi tessellation, which is indicated generally by reference number 60. Each point 62 represents one set of parameters for which prediction, cost function, and cost function gradient have been evaluated. The Voronoi polytopes 64 (which, in two dimensions, are polygons) mark the individual regions of influence of each point such that each polytope defines all solution sets closer to its associated point than to any other point in the parameter space. FIG. 7 shows a response surface model 72 associated with a particular polytope 74 in a Voronoi tessellation 75. The response surface model 72 has a value, which is expressed graphically in three dimensions as a height above the polytopes. The value or height of the response surface model corresponds to the value of the cost function. The response surface model also has a slope, which corresponds to the cost function gradient. The slope of the response surface model suggests a direction in which a more optimal solution within the polytope may exist. In FIG. 7 an arrow 76 representing the cost function gradient points in a downward direction along the surface of response surface model 72. Arrow 76 suggests a direction in which the cost function will be minimized within the response surface model 72.

Figure 8:
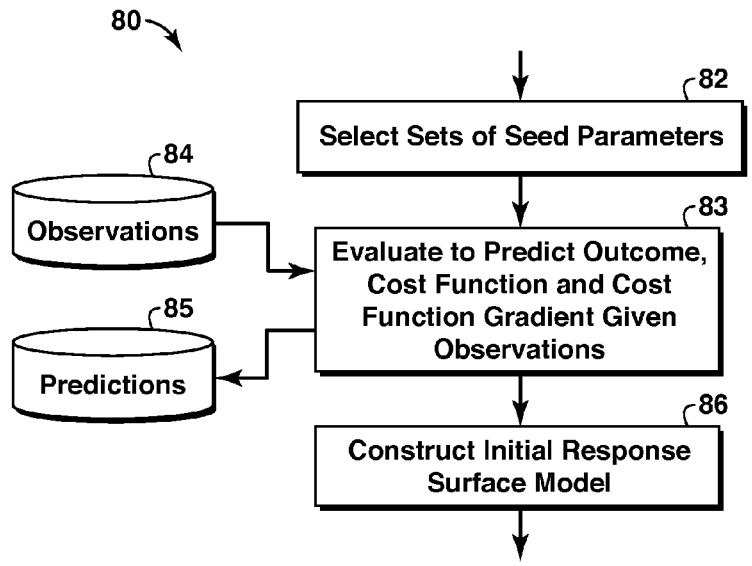
FIG. 8 is a flowchart showing a method of constructing an initial response surface model in an optimization method.
Figure 9:
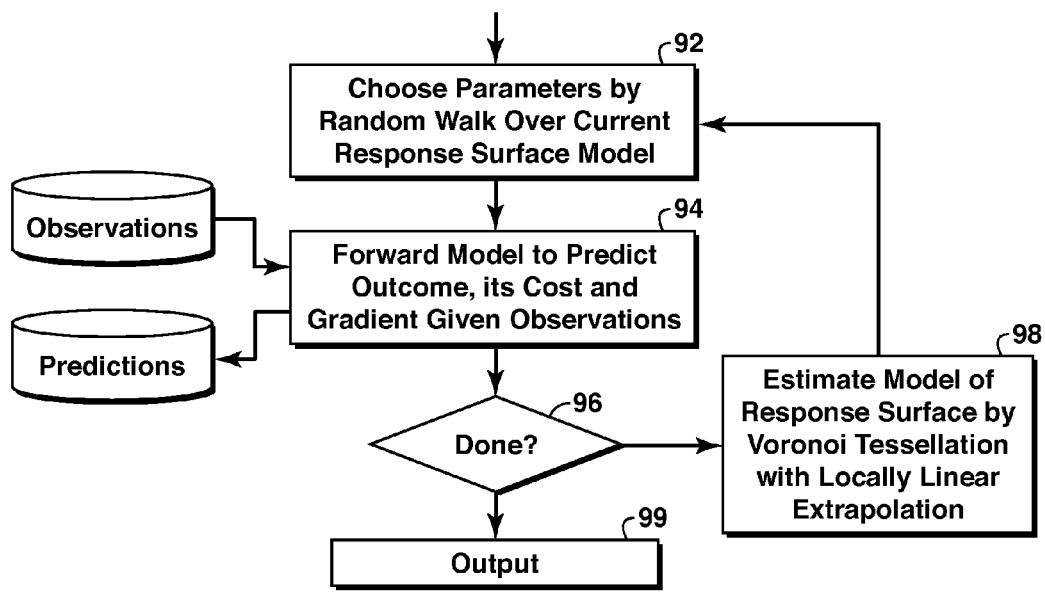
FIG. 9 is a flowchart showing an optimization method using Voronoi tessellation.

FIGS. 8 and 9 show a method 80 in which Voronoi tessellations are used to model a response surface to find an extremum. To construct the initial Voronoi tessellation a plurality of points are needed. At block 82 a plurality of sets of initial parameter values are chosen, and at block 83 each of the plurality of sets of initial parameter values are applied to a numerical model to predict an outcome. Observations (block 84) are used to predict and/or compute an associated cost, and an associated gradient of the cost for each of the sets of initial parameters. The predictions are stored at block 85 for further iterations. At block 86 an initial geometric approximation of the parameter space is estimated using Voronoi tessellation, where each point defining the polytopes corresponds to a set of initial parameter values. The Voronoi tessellation may be constructed as demonstrated in FIGS. 6 and 7. An initial response surface model is formed from the costs and cost gradients associated with each of the plurality of sets of initial parameter values. The response surface model is shown in the figures as having three dimensions, although in models with more than two parameters the response surface model may be characterized in many dimensions. Once the initial geometric approximation and the response surface model are constructed, subsequent sets of parameter values are selected by considering the response surface model, and these subsequent sets of parameter values are tested by evaluating the numerical model and its associated cost function and cost function gradient. At block 92 (FIG. 9) a new set of parameters may be chosen by selecting or randomly drawing a point from one of the polytopes with the currently lowest cost function value. This random draw is biased towards the lower values of the locally linear response-surface model using the associated cost function gradient value. It should be noted, however, that selecting a new set of parameters—and therefore adding a new point to the Voronoi tessellation—may require dividing the Voronoi cell in which the new point has been drawn or selected. Furthermore, choosing a new set of parameters inside a given polytope may affect other polytopes in the tessellation. Because each polytope represents the region of closest influence of a point included therein, adding a point will also force neighboring polytopes to deflate in volume because the new point will claim some of neighboring polytopes' volumes under its region of influence. Thus, adding a new point will not only split one polytope but may also readjust the volume of other polytopes in the geometric approximation by adjusting those polytopes' boundaries as well.

The random draw or selection of a new set of parameter values (i.e. a new point in the tessellation shown in FIG. 6) may be accomplished by choosing one of the currently N best polytopes, where 'best polytope' is defined as the polytope having the lowest cost function value. The value of N should be chosen to increase the likelihood of convergence to an optimal solution. A small number for N, for example 1 or 2, will result in rapid convergence to an "optimal" polytope and associated parameter set, but nearly guarantees that the "optimal" parameter set will only be a suboptimal local extremum and neither the global extremum nor even a truly good local extremum. A larger value for N will enhance the chance of finding a good local extremum. Nevertheless, it is possible that the global extremum or at least the best local extrema are not located near the currently N best polytopes. In that case, the global extremum may never be found because the method selects continuously new sets of parameters near what is defined currently as the best polytope, while the global extremum may be located in a polytope that is not defined currently as the best polytope. The method therefore uses a probability threshold q (a number in the range $0 \leq q \leq 1$) which indicates how often the new parameter set is chosen not from within one of the polytopes associated with the currently N best polytopes, but from within a random polytope. The probability threshold $p=1-q$ indicates how often a new parameter set is selected near one of the currently best parameter sets, or within a polytope associated therewith. A large value of p, and thus a small value of q, tends to emphasize local optimization of the response surface model, while a small value of p, and thus a large value of q, tends to emphasize global discovery by random exploration of the response surface model.

It might appear that the control variables N and q are mutually exclusive and that therefore the method is sensitive to the choice of N, p and q. However, the two control variables are coupled more than initially apparent. At first, few sets of parameter values have been evaluated and the Voronoi tessellation consists of very large polytopes. Focusing on the currently best polytopes still results in a random search because the associated response surface is not representable by a linear approximation due to the large size of the polytopes. After many iterations, however, many parameter sets are selected near parameter sets that were deemed best at one time. Thus, a large number of parameter sets will at least be suboptimal. Choosing a polytope for bisection or division at random will increasingly yield one of these smaller, suboptimal parameter sets and polytopes instead of the larger polytopes that overall are less optimal but may contain a better parameter set within its boundaries. It can be seen, therefore, that the method begins by focusing on exploring the entire parameter space and gradually shifts toward optimization in identified portions (i.e., polytopes) of the parameter space. The values of control variables N and q guide how rapidly exploration transitions to optimization.

An additional safeguard against entrapment in a local extremum is based on the volume, or at least an estimate thereof, of the polytope selected for refinement. Once a general location of an extremum (most likely a local extremum) is discovered, the algorithm keeps selecting nearby points according to the value of the cost function and its gradient unless a better extremum were to be appear somehow. In doing so, the polytopes associated with those nearby selected points get progressively smaller and could fall below the resolution of floating point numbers. Moreover, resolving an optimum with exceeding accuracy might be pointless, especially if the extremum is a local extremum. Thus, if the size of the polytope selected for refinement falls below a threshold, the polytope is not considered for further refinement. Instead, new parameters are found by random drawing or selection, refining a random polytope, or refining the next best polytope. Either of these options switches the algorithm from a local optimization mode to a global optimization mode that searches for promising areas in the parameter space.

Figure 10:
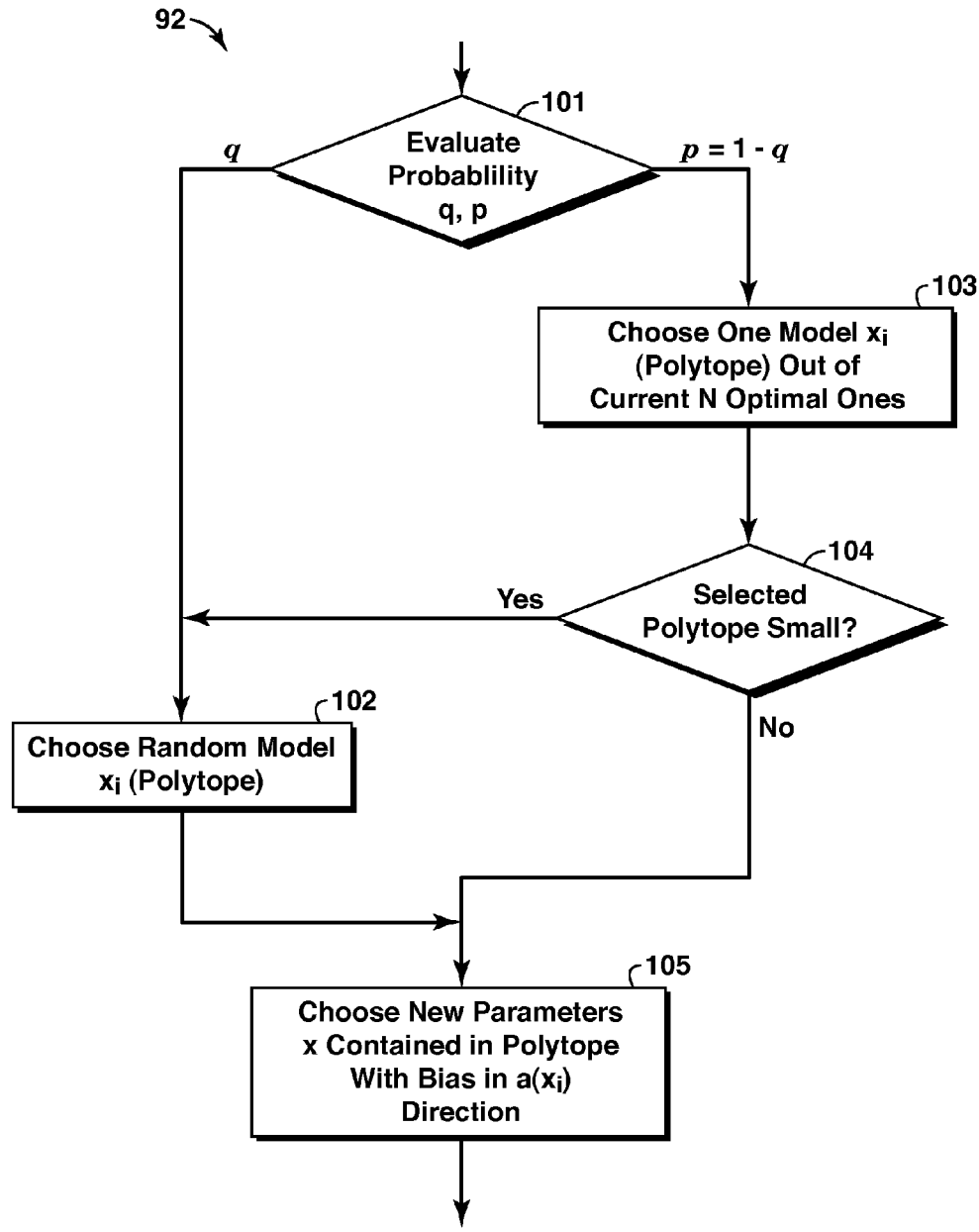
FIG. 10 is a flowchart showing a method of selecting parameter sets in an optimization method.

FIG. 10 is a flowchart showing possible steps of accomplishing block 92 in FIG. 9. At block 101, a random number between 0 and 1 is drawn and compared against q and/or q=1−p. If this number is smaller than q, then a random polytope is selected for further evaluation. Otherwise, one of the currently N optimal polytopes is chosen. A high value of q increases the likelihood that a random polytope is selected for further evaluation, as shown at block 102. A high value of p increases the likelihood that a polytope is selected from one of the current N optimal polytopes, as shown at block 103. At block 104 it is determined whether the size or volume of the selected polytope is less than a pre-determined threshold. If so, a random polytope is selected at block 102.

Figure 11:
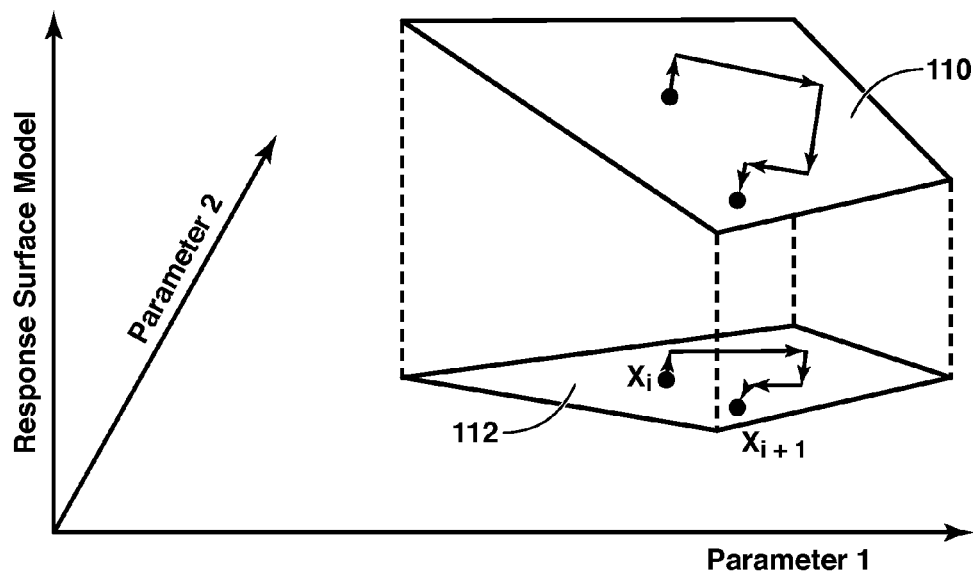
FIG. 11 is a graph showing a random walk along a polytope and an associated response surface model.

Once a polytope of proper size has been selected—either at block 103 or at block 102, at block 105 the next set of parameter values to be used for the evaluation of the numerical model and its cost function and cost function gradient is selected by performing a random walk over the sloping response-surface model $$r(x) = C(x_i) + a(x_i)(x - x_i)$$ (Equation 1)

where $x_i$ denotes the previously evaluated parameter set governing this particular polytope, This random walk is biased by the cost function gradient, giving points in the direction of the gradient a higher probability of being selected. Because randomly selecting a point out of a multi-dimensional polytope may be computationally difficult, randomly selecting a point in a polytope may be replaced by a few iterations of a random walk along each dimension as follows. FIG. 11 shows a response surface model 110 associated with a two-dimensional polytope 112 that represents a solution space, defined by a point $x_i$. The solution space has two parameters: parameter 1 and parameter 2. The random walk starts at point $x_i$. A new value for parameter 1 may be found within the bounds of the polytope by randomly drawing or selecting a new value using an exceedance distribution, shown in FIG. 12 at reference number 120. The exceedance distribution $y_1(x_1)$ may be characterized as a value between 0 and 1 that may vary as parameter 1 varies from a first polytope boundary $b_1$ to a second polytope boundary $e_1$ with respect to parameter 1. The value of the exceedance distribution may relate to the trace of the response-surface model along the first parameter dimension, which is shown at 130 in FIG. 13. The exceedance distribution $y_1(x_1)$ for the first parameter with gradient component $a_1$ is defined as $$y_1(x_1) = 1 - \frac{x_1^2}{(e_1 - b_1)^2} \text{ for } a_1 > 0$$ (Equation 2)

$$y_1(x_1) = \frac{x_1}{(e_1 - b_1)} \text{ for } a_1 = 0$$

$$y_1(x_1) = \frac{x_1^2}{(e_1 - b_1)^2} \text{ for } a_1 < 0$$

Figure 12:
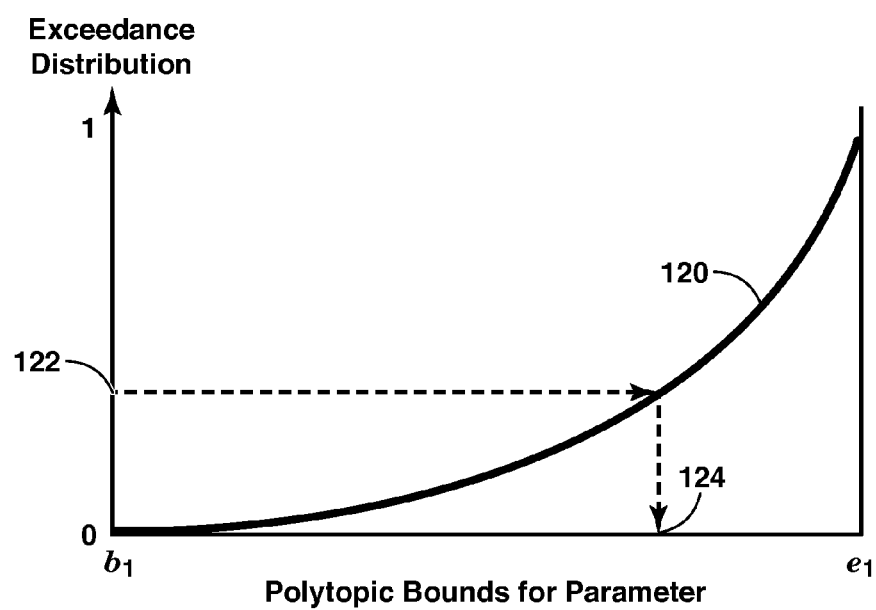
FIG. 12 is a graph describing bounds for a parameter used with optimization methods.
Figure 13:
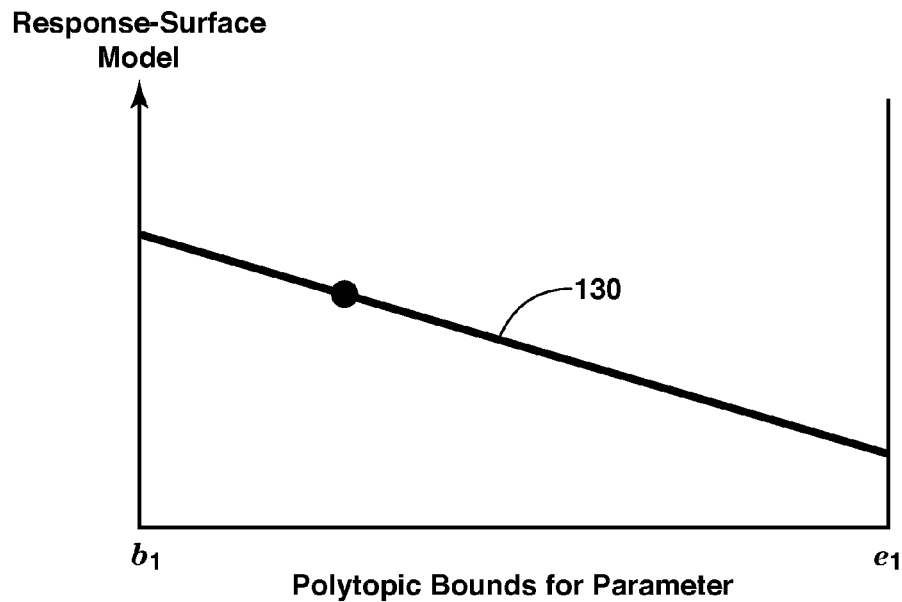
FIG. 13 is a graph describing bounds for a parameter used with optimization methods.

It can be seen in FIGS. 12 and 13 that a higher exceedance distribution value 120 corresponds to a lower response surface model value 130 with respect to values of parameter 1 between the first and second polytope boundaries $b_1$, $e_1$.

To draw a new point biased toward the optimization of parameter 1, a random number $y_1$ may be selected from a uniform distribution between zero and one, and the inverse function of the exceedance distribution may be applied to this random number. For the random number $y_1$, the new point $x_1$ is explicitly determined as $$x_1 = (e_1 - b_1)\sqrt{1 - y_1} \text{ for } a_1 > 0$$

$$x_1 = (e_1 - b_1)y_1 \text{ for } a_1 = 0$$

$$x_1 = (e_1 - b_1)\sqrt{y_1} \text{ for } a_1 < 0$$ (Equation 3)

Figure 14:
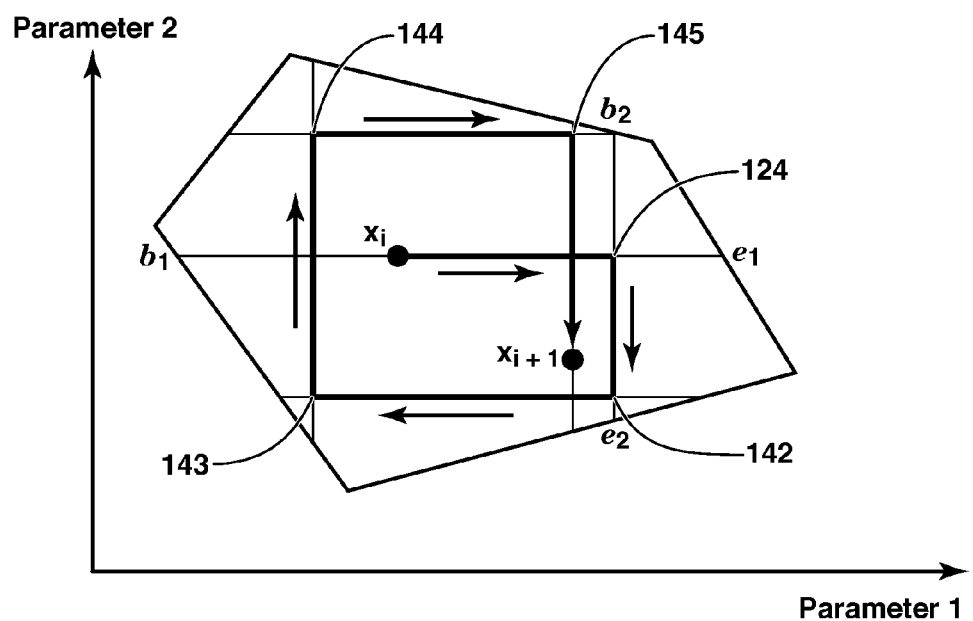
FIG. 14 is a graph showing a random walk along a polytope.

In other words, the value of the random number is set as the value of the exceedance, as shown at 122 in FIG. 12. The value for the new point is the parameter value between the first and second polytope boundaries $b_1$, $e_1$ corresponding to the selected exceedance value, as shown at 124. The new point is shown as point 124 in FIG. 14. Continuing the random walk within polytope 112, a new value for parameter 2 may be found using concepts similar to those used with parameter 1. For example, the new value for parameter 2 is found within the bounds of polytope 112 beginning at point 124 and ending at point 142, which represents a value between first and second polytope boundaries $b_2$, $e_2$ with respect to parameter 2. The process iteratively and sequentially searches for new values for parameters 1 and 2, finding new points 143, 144, 145 within polytope 112 until arriving at point $x_{i+1}$. One iterative pass over all dimensions or parameters, however, usually is not sufficient, and the iterative procedure is repeated in this manner a few times to allow the parameters to become independent or uncorrelated. New values for each additional parameter are found by sequentially and iteratively repeating this process for each parameter. The more iterations, the better the new set of parameters is biased by the gradient. In practice, however, three to five iterations have been shown to be sufficient. The slope of the response-surface model biases but does not force the random walk towards parameters with a lower cost function.

Returning to method FIG. 9, once parameters have been chosen by a random walk over the current response surface model, at block 94 a numerical model is applied to the parameters to predict an outcome as well as an associated cost and a gradient of the cost as previously described. If at block 96 it is determined that a satisfactory extremum has not been located or if a prescribed number of iterations have not been exceeded, at block 98 the response surface associated with the chosen parameters is estimated by Voronoi tessellation. Blocks 92, 94 and 98 are repeated until a satisfactory extremum has been located or a prescribed number of iterations have been exceeded. If so, at block 99 the parameter set or sets having the best cost is outputted as discussed previously herein. These sets of parameter values may used to update a geologic model of a subsurface region or to assist in other hydrocarbon management activities. Additionally or alternatively, the predicted outcome(s) associated with parameter set(s) having the best cost may be outputted and used to update the geologic model.

Figure 15:
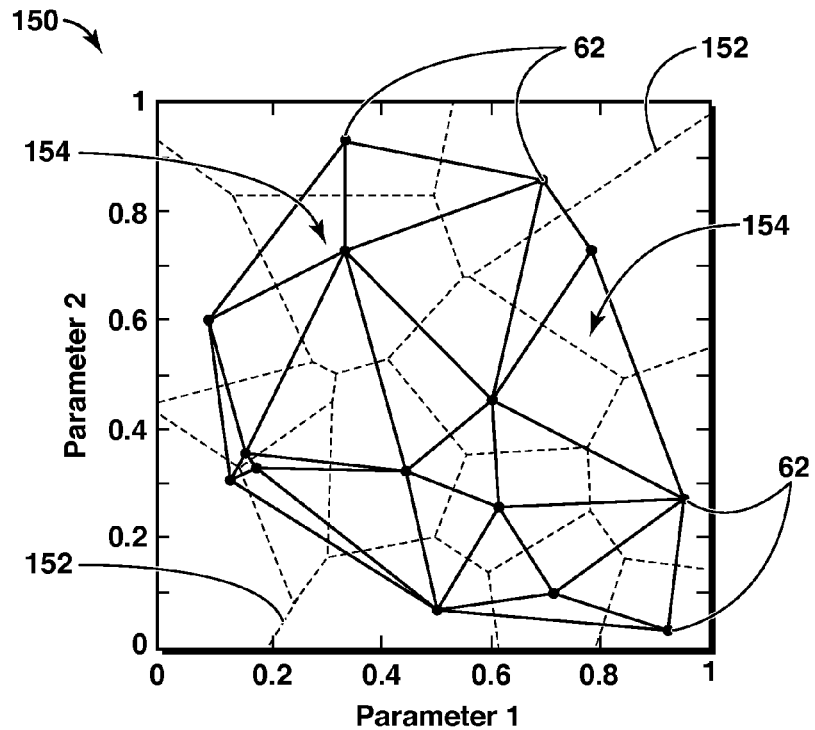
FIG. 15 is a graph showing a two-dimensional Delaunay triangulation.
Figure 16:
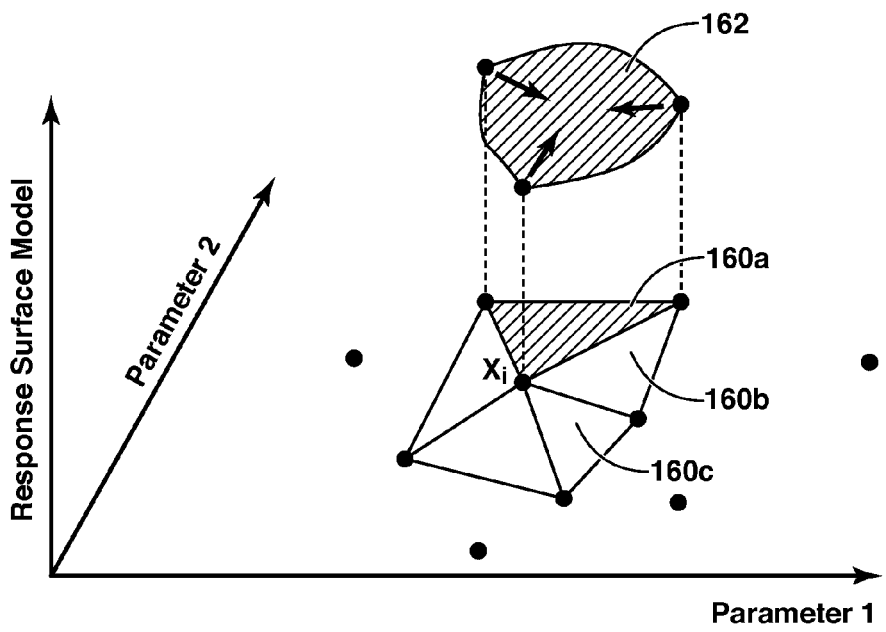
FIG. 16 is a graph showing Delaunay triangles and a response surface model associated with one of the triangles.

Another aspect is based on Delaunay triangulation combined with a response surface model based on interpolation, where the interpolation is based preferentially on cubic functions, although other functional forms that can be fully parameterized using the costs and gradients may be used. In the Delaunay Triangulation, non-overlapping triangles are formed from a set of points such that the triangles maximize the minimum angles of all the angles of the triangles, in other words, they tend to avoid "sliver" triangles, i.e., highly elongated, narrow triangles. The idea can be generalized to three or more dimensions by segmenting the parameter space into tetrahedra or hypertriangles. FIG. 15 depicts a Delaunay triangulation 150 for the same sets of parameter values as used in the Voronoi tessellation shown in FIG. 6. Each point 62 represents one set of parameter values for which prediction, cost function, and cost function gradient have been evaluated. Dashed lines 152 represent the borders of the Voronoi polytopes 64 associated with the points 62. Delaunay triangles 154 are constructed with points 62 defining the vertices of the triangles. FIG. 16 depicts a set of Delaunay triangles 160a, 160b, 160c related to a parameter set $x_i$. For each Delaunay triangle or hypertriangle, the sets of parameter values corresponding to its vertices are used for a numerical model computation and thus evaluated for cost C and cost function gradient a. However, it may be more practical to construct the triangles from known vertices, i.e., from all parameter sets that have been evaluated with the numerical model up to that time. For each triangle or hypertriangle, a response surface model 162 is then built. In the preferred cubic case, the response surface model may be built based on an incomplete cubic polynomial that lacks bilinear terms. For example, in two dimensions the response surface r(x,y) associated with one Delaunay triangle 160a may be of the form shown in Equation 4:

$$r(x,y)=a_{00}+a_{10}x+a_{01}y+a_{20}x^2+a_{02}y^2+a_{21}x^2y+a_{12}xy^2+a_{30}x^3+a_{03}y^3 \quad \text{(Equation 4)}$$

This equation has nine free coefficients $a_{ij}$ and is determined by nine values: cost and two gradient coefficients for each of the three vertices.

Refining a parameter set $x_i$, or in other words, searching for a more optimal parameter set near $x_i$, commences by identifying the Delaunay hypertriangle pointed at in direction $a_i$ from vertex $x_i$. Its response surface model r(x) is constructed using the vertices (i.e., parameter sets) of the triangle and their associated costs and cost gradients. The response surface model is used to bias the selection of a new set of parameters from within this hypertriangle. Finding the new set of parameters using the cubic response surface model can be done analytically or stochastically. In the analytic approach, multidimensional calculus is used to determine the optimum of the cubic model. In the stochastic approach, a random walk is performed over the cubic surface, as has been discussed previously herein.

Figure 17:
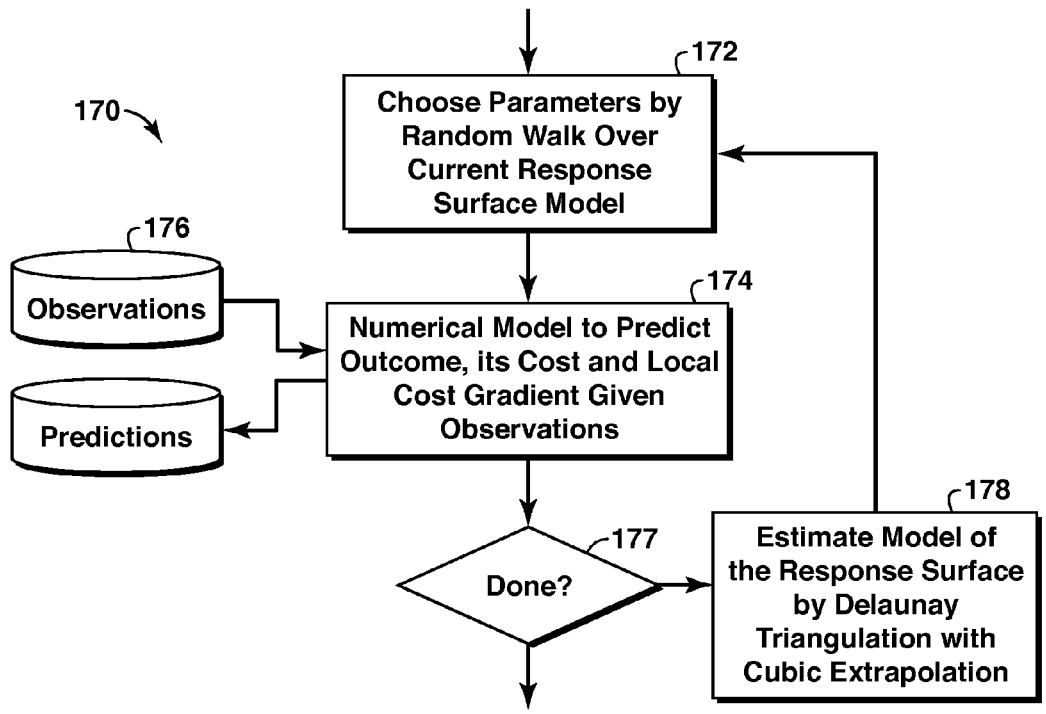
FIG. 17 is a flowchart showing an optimization method using Delaunay triangulation.

FIG. 17 is a flowchart showing a method 170 of finding an extremum using Delaunay triangulation. At block 172 a parameter set, i.e., a point, is chosen from the current response surface model, and if no response surface model exists, a set of parameter values is chosen in a random or semi-random manner. At block 174 the set of parameter values is run through a numerical model to obtain a predicted output, and using observations stored at block 176, its cost function and the cost function gradient. If it is determined at block 177 that finishing conditions are not met, at block 178 a model of the response surface is estimated using Delaunay triangulation, preferably using the cubic extrapolation as disclosed herein. When constructing the Delaunay triangulation, the set of parameter values most recently selected is added to the sets of parameter values selected in previous iterations of the method. The method returns to block 172 and repeats until finishing conditions are met.

Inventive aspects may be demonstrated by referring to an example two-dimensional problem where the true response surface is given in Equation 5:

$$R(x)=R(x,y)=2\,xy J_1(16*\sqrt{x^2+y^2})/(x^2+y^2) \quad \text{(Equation 5)}$$

Figure 18:
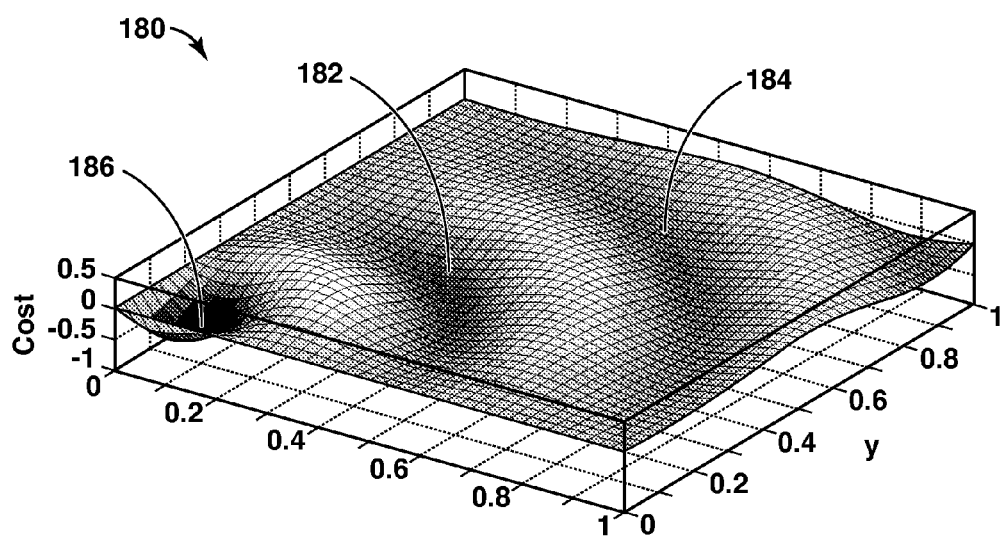
FIG. 18 is a graph showing a cost function.

This true response surface is displayed graphically in FIG. 18 at reference number 180. The true response surface has local optima or extrema 182, 184. The true response surface also has a global optimum or extremum 186. The methods disclosed herein may be used to search for the global optimum 186, as depicted in FIGS. 19A-D, which show response surface 180 in two dimensions. FIG. 19A depicts the selection of 20 sets of parameter values that are randomly or semi-randomly chosen as initial guesses or estimates of where an optimum or extremum may occur in the response surface. These initial guesses or estimates of parameter sets may be called seed models, and may be selected according to the method displayed in FIG. 8. Each parameter set is expressed as a point 192, with dashed lines 194 representing contour lines of the response surface 180. Local optima 182, 184 and global optimum 186 from FIG. 18 are shown in FIGS. 19A-D as well. A Voronoi tessellation of the parameter space may be generated based on the seed models, with polytopes 196a and 196b, for example. After a Voronoi tessellation has been generated based on the seed models, additional parameter sets may be chosen iteratively according to disclosed aspects, such as the methods disclosed in reference to FIGS. 5 and/or 9-15. FIG. 19B shows the optimization process after an additional 60 sets of parameter values—shown as points—have been chosen and evaluated. Adding sets of parameter values to the model has changed the structure of the Voronoi tessellation to include smaller polytopes. At this point the selected sets of parameter values are concentrated in local optimum 184. This is to be expected, as disclosed methods tend to generate new parameter sets near the best parameter set known at the time. However, as the polytopes are divided to become progressively smaller, and/or as the probability q is set higher than the probability p (as discussed in relation to FIG. 10), a new polytope is selected randomly, and a parameter set in the new polytope is evaluated. After 80 more parameter sets have been selected (FIG. 19C), for a total of 160 parameter sets, the polytopes defining local extremum 184 are far too small for further meaningful analysis. Parameter sets are randomly selected, eventually evaluating parameter sets near the global extremum 186. The disclosed methods then hone in on the global extremum, as shown in FIG. 19D, which depicts the parameter space after a total of 240 parameter sets have been evaluated.

Figure 20A:
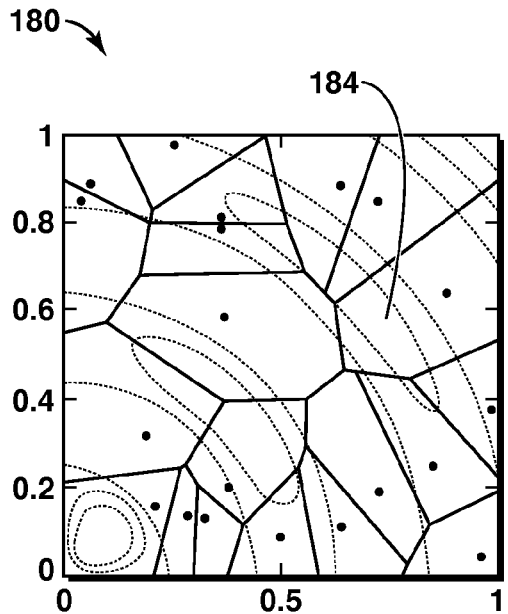
FIGS. 20A, 20B, 20C and 20D are graphs showing the outputs of another optimization method using Voronoi tessellation.
Figure 20B:
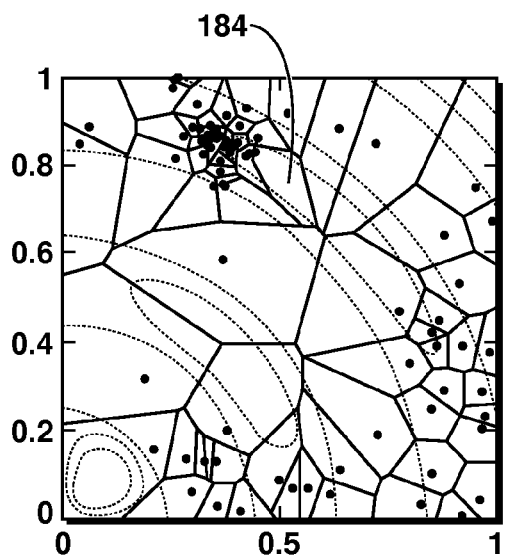
Figure 20C:
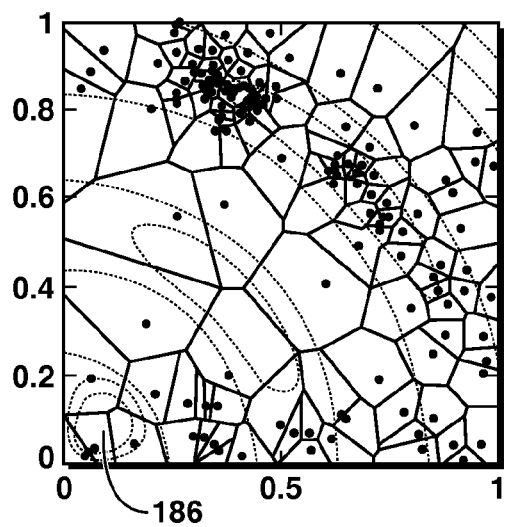
Figure 20D:
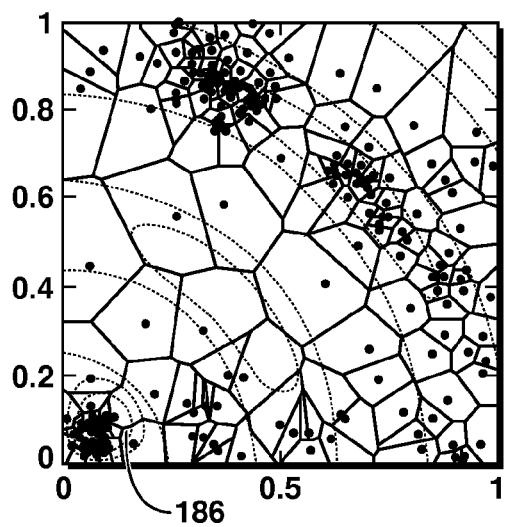

The optimization shown in FIGS. 19A-19D used a value of 1 for the variable N. In other words, each additional parameter set was chosen from the most optimal polytope at the time. FIGS. 20A-20D show an optimization method using cost function 180 with N=5. In other words, each additional parameter set is chosen from the 5 most optimal polytopes at the time. Optimization from 20 seed models (FIG. 20A) progresses similarly to when N=1, but the local extremum 184 is tracked to a much greater degree through 80 parameter sets (FIG. 20B) and 160 parameter sets (FIG. 20C). Around parameter set 160 the global extremum 186 is discovered and the optimization begins to refocus on the global extremum. By the time parameter set 240 is evaluated (FIG. 20D) the optimization has focused on the global extremum 186.

In an actual optimization problem a cost function equation (which characterizes the response surface model) is likely not known beforehand, and the contours shown in FIGS. 19A-19D are not known either. Also, the number of evaluated parameter sets in a given area of the parameter space is not indicative of an optimal solution, but is more relevant as a history of chosen parameter sets. For example, although FIG. 19D shows many more points near local extremum 184 than are near global extremum 186, it is the output of the numerical model that determines whether a parameter set is at or near a global extremum—not the number of parameter sets in a given area of the parameter space.

Figure 21:
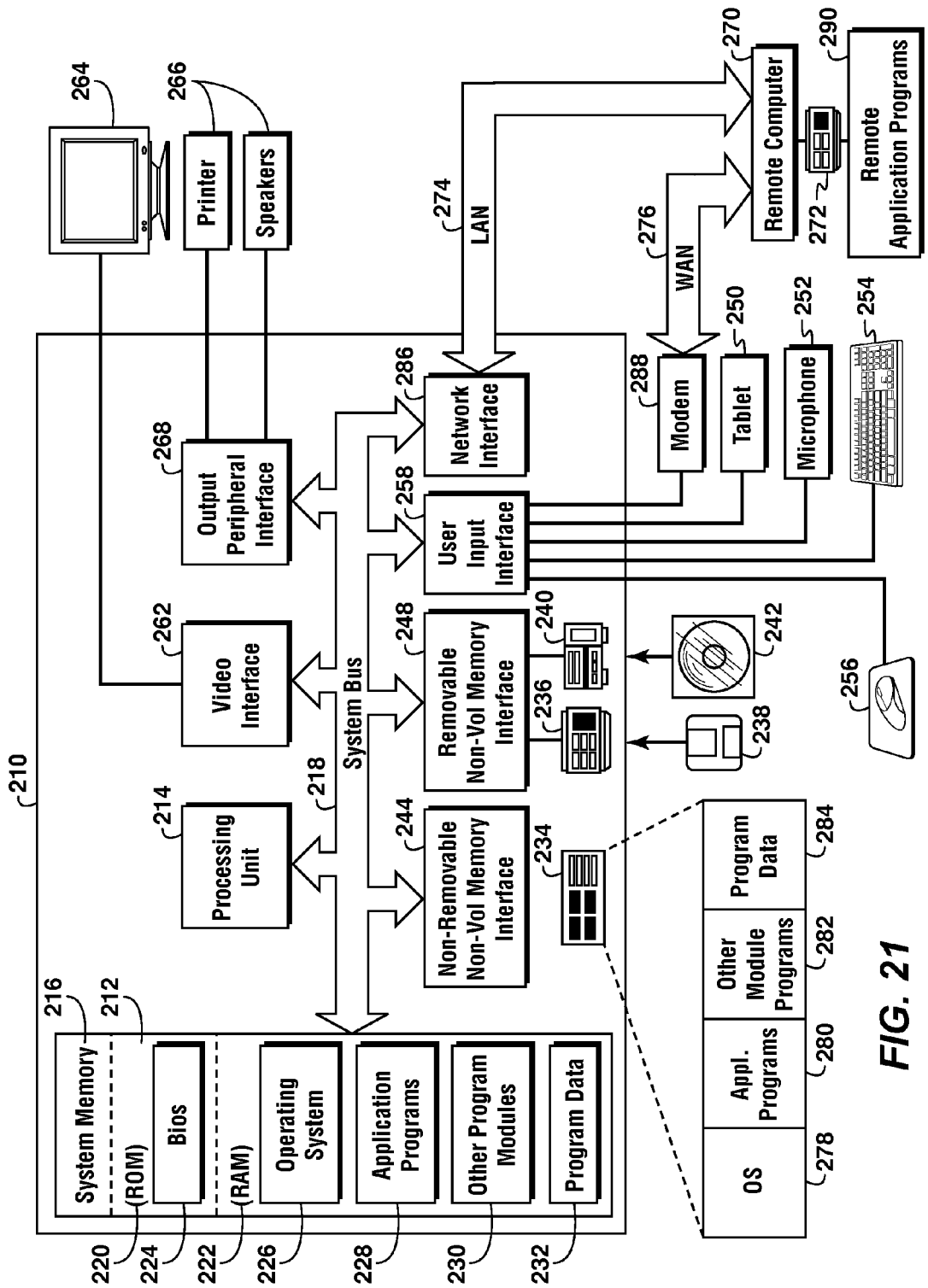
FIG. 21 is a simplified block diagram of a computer environment.

FIG. 21 illustrates an exemplary system within a computing environment for implementing the system of the present disclosure and which includes a computing device in the form of a computing system 210, which may be a UNIX-based workstation or commercially available from Intel, IBM, AMD, Motorola, Cyrix and others. Components of the computing system 210 may include, but are not limited to, a processing unit 214, a system memory 216, and a system bus 246 that couples various system components including the system memory to the processing unit 214. The system bus 246 may be any of several types of bus structures including a memory bus or memory controller, a peripheral bus, and a local bus using any of a variety of bus architectures.

Computing system 210 typically includes a variety of computer readable media. Computer readable media may be any available media that may be accessed by the computing system 210 and includes both volatile and nonvolatile media, and removable and non-removable media. By way of example, and not limitation, computer readable media may comprise computer storage media and communication media. Computer storage media includes volatile and nonvolatile, removable and non removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 210.

The system memory 216 includes computer storage media in the form of volatile and/or nonvolatile memory such as read only memory (ROM) 220 and random access memory (RAM) 222. A basic input/output system 224 (BIOS), containing the basic routines that help to transfer information between elements within computing system 210, such as during start-up, is typically stored in ROM 220. RAM 222 typically contains data and/or program modules that are immediately accessible to and/or presently being operated on by processing unit 214. By way of example, and not limitation, FIG. 21 illustrates operating system 226, application programs 230, other program modules 230 and program data 232.

Computing system 210 may also include other removable/non-removable, volatile/nonvolatile computer storage media. By way of example only, FIG. 21 illustrates a hard disk drive 234 that reads from or writes to non-removable, nonvolatile magnetic media, a magnetic disk drive 236 that reads from or writes to a removable, nonvolatile magnetic disk 238, and an optical disk drive 240 that reads from or writes to a removable, nonvolatile optical disk 242 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 234 is typically connected to the system bus 246 through a non-removable memory interface such as interface 244, and magnetic disk drive 236 and optical disk drive 240 are typically connected to the system bus 246 by a removable memory interface, such as interface 248.

The drives and their associated computer storage media, discussed above and illustrated in FIG. 21, provide storage of computer readable instructions, data structures, program modules and other data for the computing system 210. In FIG. 21, for example, hard disk drive 234 is illustrated as storing operating system 278, application programs 280, other program modules 282 and program data 284. These components may either be the same as or different from operating system 226, application programs 230, other program modules 230, and program data 232. Operating system 278, application programs 280, other program modules 282, and program data 284 are given different numbers hereto illustrates that, at a minimum, they are different copies.

A user may enter commands and information into the computing system 210 through input devices such as a tablet, or electronic digitizer, 250, a microphone 252, a keyboard 254, and pointing device 256, commonly referred to as a mouse, trackball, or touch pad. These and other input devices often may be connected to the processing unit 214 through a user input interface 258 that is coupled to the system bus 218, but may be connected by other interface and bus structures, such as a parallel port, game port or a universal serial bus (USB).

A monitor 260 or other type of display device may be also connected to the system bus 218 via an interface, such as a video interface 262. The monitor 260 may be integrated with a touch-screen panel or the like. The monitor and/or touch screen panel may be physically coupled to a housing in which the computing system 210 is incorporated, such as in a tablet-type personal computer. In addition, computers such as the computing system 210 may also include other peripheral output devices such as speakers 264 and printer 266, which may be connected through an output peripheral interface 268 or the like.

Computing system 210 may operate in a networked environment using logical connections to one or more remote computers, such as a remote computing system 270. The remote computing system 270 may be a personal computer, a server, a router, a network PC, a peer device or other common network node, and typically includes many or all of the elements described above relative to the computing system 210, although only a memory storage device 272 has been illustrated in FIG. 21. The logical connections depicted in FIG. 21 include a local area network (LAN) 274 connecting through network interface 286 and a wide area network (WAN) 276 connecting via modem 288, but may also include other networks. Such networking environments are commonplace in offices, enterprise-wide computer networks, intranets and the Internet.

For example, computer system 210 may comprise the source machine from which data is being migrated, and the remote computing system 270 may comprise the destination machine. Note however that source and destination machines need not be connected by a network or any other means, but instead, data may be migrated via any machine-readable media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. For example, a storage medium may be coupled to the processor such that the processor may read information from, and write information to, the storage medium. In the alternative, the storage medium may be integral to the processor. The processor and the storage medium may also reside in an application-specific integrated circuit (ASIC). The bus may be an optical or conventional bus operating pursuant to various protocols that are well known in the art. One system that may be used is a Linux workstation configuration with a Linux 64-bit or 32-bit Red Hat Linux WS3 operating system, and an NVIDIA Quadro graphics card. However, the system may operate on a wide variety of hardware.

Figure 22:
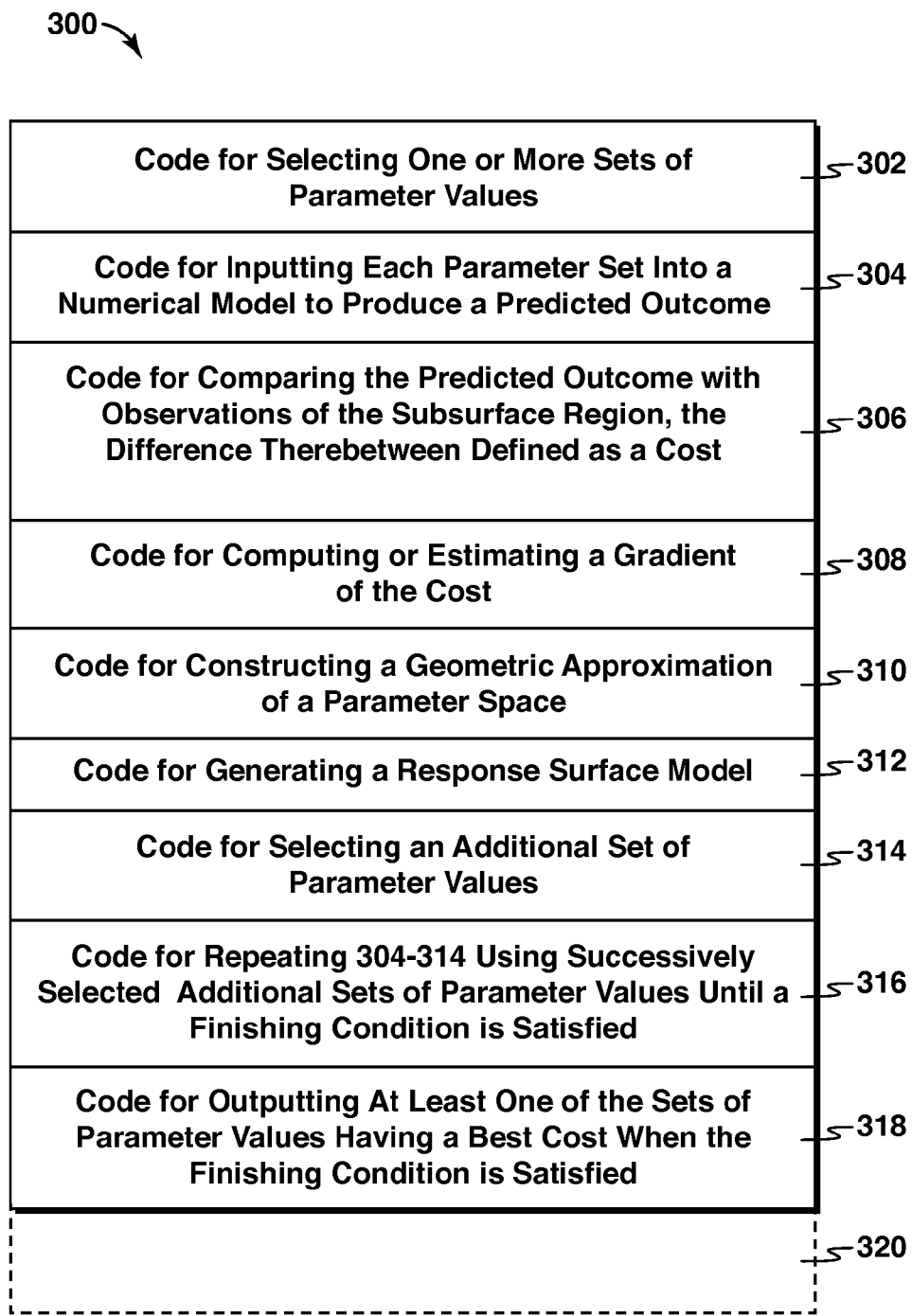
FIG. 22 is a simplified block diagram of machine-readable computer code.

FIG. 22 is a block diagram of a representation of machine-readable code 300 that may be used with a computing system such as computing system 210. At block 302 code is provided for selecting one or more sets of parameter values, where each parameter either directly or indirectly represents a geologic property of a subsurface region. An example of a parameter that directly represents a geologic property is permeability. An example of a parameter that controls a numerical model—thus indirectly representing a geologic property through the resulting output of the numerical model—is sediment deposition rate. At block 304 code is provided for inputting each of the sets of parameter values into the numerical model to produce a predicted outcome for each set of parameter values. At block 306 code is provided for comparing the predicted outcome for each set of parameter values with observations of the subsurface region, the difference therebetween defined as a cost associated with each set of parameter values. At block 308 code is provided for obtaining (such as by computing or estimating) a gradient of the cost associated with each set of parameter values. At block 310 code is provided for constructing a geometric approximation of a parameter space defined by one or more formations, where each formation corresponds to a set of parameter values for which cost and the gradient of the cost has been evaluated. As discussed herein, the geometric approximation may be a Voronoi tessellation or a Delaunay triangulation, or another type of geometric approximation. At block 312 code is provided for generating a response surface model based on the geometric approximation, the response surface model expressing the cost and the gradient of the cost associated with each formation. At block 314 code is provided for selecting an additional set of parameter values based at least in part on the response surface model associated with previously selected sets of parameter values. The code provided at block 314 is performed or executed when a finishing condition is not satisfied. At block 316 code is provided for repeating the operation or execution of the code in blocks 304, 306, 308, 310, 312, and 314 using successively selected additional sets of parameter values until a finishing condition is satisfied. At block 318 code is provided for outputting at least one of the sets of parameter values having a predetermined level of cost to a geologic model of the subsurface region. Code may also be provided to update the geologic model using one or more of the sets of parameter values and/or the predicted outcomes corresponding to any of the sets of parameter values. Code effectuating or executing other features of the disclosed aspects and methodologies may be provided as well. This additional code is represented in FIG. 22 as block 320 and may be placed at any location within code 300 according to computer code programming techniques.

Figure 23:
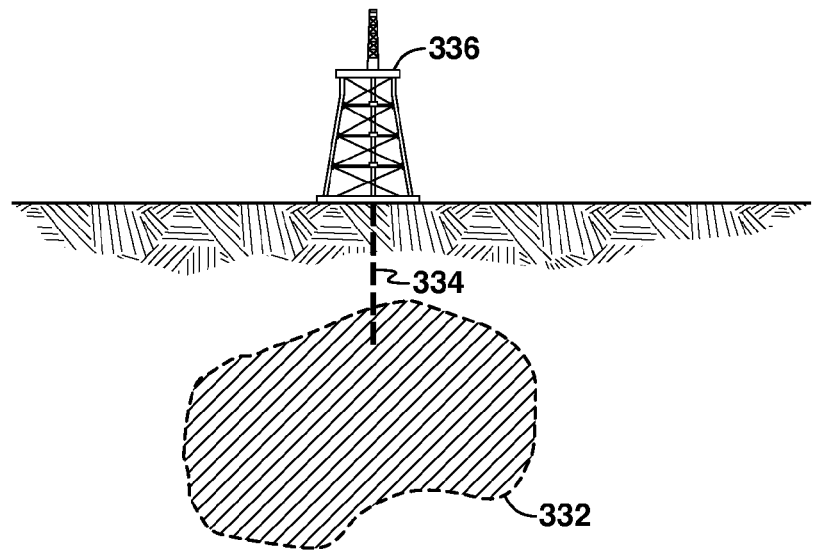
FIG. 23 is a schematic diagram of a hydrocarbon extraction activity.
Figure 24:
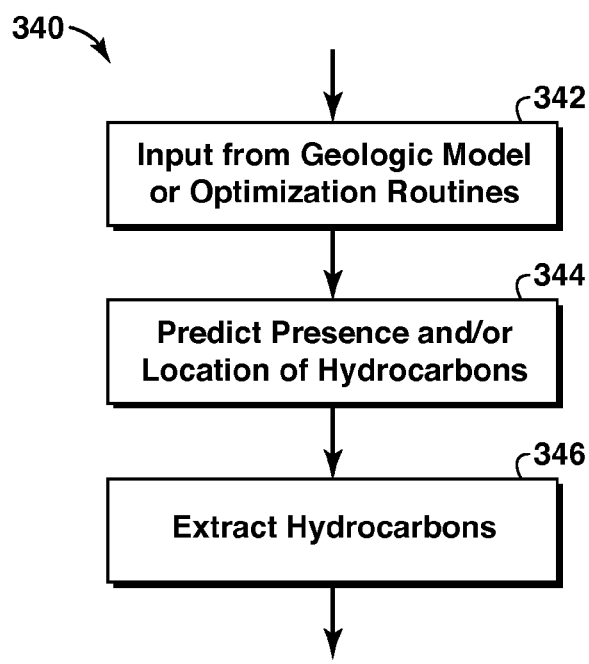
FIG. 24 is a flowchart of a method of extracting hydrocarbons from a subsurface region.

Aspects disclosed herein may be used to perform hydrocarbon management activities such as extracting hydrocarbons from a subsurface region, which is indicated by reference number 332 in FIG. 23. A method 340 of extracting hydrocarbons from subsurface reservoir 332 is shown in FIG. 24. At block 342 inputs are received from a geologic model of the subsurface region, where the geologic model as been improved using the methods and aspects disclosed herein. At block 344 the presence and/or location of hydrocarbons in the subsurface region is predicted. At block 346 hydrocarbon extraction is conducted to remove hydrocarbons from the subsurface region, which may be accomplished by drilling a well 334 using oil drilling equipment 336 (FIG. 23). Other hydrocarbon management, for example the sequestration of $CO_2$, activities may be performed using the invention.

The disclosed embodiments and methodologies may be susceptible to various modifications and alternative forms and have been shown only by way of example. The disclosed embodiments and methodologies are not intended to be limited to the particular embodiments disclosed herein, but include all alternatives, modifications, and equivalents falling within the spirit and scope of the appended claims.

What is claimed is:

1. A method of improving a geologic model of a subsurface region, comprising:
    (a) selecting one or more sets of parameter values, each parameter directly or indirectly representing a geologic property;
    (b) inputting each of the one or more sets of parameter values into a numerical model to produce a predicted outcome for each set of parameter values;
    (c) comparing the predicted outcome for each of the one or more sets of parameter values with observations of the subsurface region, the difference therebetween defined as a cost associated with each of the one or more sets of parameter values;
    (d) obtaining a gradient of the cost associated with each of the one or more sets of parameter values;
    (e) constructing a geometric approximation of a parameter space defined by one or more formations, each formation corresponding to one of the one or more sets of parameter values for which the cost and the gradient of the cost have been evaluated;

(f) generating a response surface model based on the geometric approximation, the response surface model expressing the cost and the gradient of the cost associated with each formation;

(g) when a finishing condition is not satisfied, selecting at least one additional set of parameter values based at least in part on the response surface model associated with previously selected sets of parameter values;

(h) repeating parts (b), (c), (d), (e), (f) and (g) using successively selected additional sets of parameter values to update the geometric approximation and the response surface model until the finishing condition is satisfied;

(i) outputting at least one of the sets of parameter values having a predetermined level of cost to a geologic model of the subsurface region; and (j) updating the geologic model, taking into account at least one of
the outputted at least one of the sets of parameter values, and
the predicted outcome corresponding to the outputted at least one of the sets of parameter values; and wherein each of the additional sets of parameter values are selected by:
selecting a number from a probability function;
when the number selected from the probability function is greater than a predefined threshold, selecting an additional set of parameter values within a formation having associated therewith an $N^{th}$ best cost, compared to costs associated with other formations in the geometric approximation, where N is a positive integer; and
when the number selected from the probability function is not greater than the predefined threshold, selecting the additional set of parameter values in a randomly selected formation in the geometric approximation.

2. The method of claim 1, wherein the geometric approximation is based on interpolation and extrapolation by Voronoi tessellation, and wherein at least one of the one or more formations is a polytope.

3. The method of claim 1, wherein the geometric approximation is based on interpolation and extrapolation by Delaunay triangulation, and wherein at least one of the one or more formations is a hypertriangle.

4. The method of claim 1, wherein the finishing condition is satisfied when one of
a predetermined number of sets of parameter values have been selected, and
a cost less than a minimum value or greater than a maximum value has been discovered is true.

5. The method of claim 1, wherein each of the additional sets of parameter values is selected at least in part by selecting an additional set of parameter values from within a formation having a better cost associated therewith than costs of other formations in the geometric approximation.

6. The method of claim 1, wherein at least one of the additional sets of parameter values are selected by performing a random walk within a formation having a better associated cost than other formations in the geometric approximation, the random walk being biased by the gradient of the cost associated with the formation.

7. The method of claim 6, wherein the random walk uses an inverse of an exceedance function to determine a parameter value of the additional set of parameter values.

8. The method of claim 1, further comprising:
extracting hydrocarbons from the subsurface region based on the updated geologic model.

9. The method of claim 1, further comprising displaying the updated geologic model.

10. The method of claim 1, wherein the gradient of the cost is computed using one of a finite difference method and an adjoint method.

11. A method of improving a geologic model of a subsurface region, comprising:

(a) obtaining observations of geologic properties in the subsurface region;

(b) selecting one or more sets of parameter values, each parameter directly or indirectly representing one of the geologic properties;

(c) inputting the one or more sets of parameter values into a numerical model to produce a predicted outcome for each of the one or more sets of parameter values;

(d) for each one or more sets of parameter values, obtaining a cost from a difference between the predicted outcome and the observations;

(e) obtaining a gradient of the cost associated with each of the one or more sets of parameter values;

(f) constructing a geometric approximation of a parameter space defined by one or more formations, each of the one or more formations corresponding to a set of parameter values for which the cost and the gradient of the cost have been evaluated;

(g) generating a response surface model based on the geometric approximation, the response surface model expressing the cost and the gradient of the cost associated with each of the one or more formations;

(h) when a finishing condition is not satisfied, selecting at least one additional set of parameter values based at least in part on the response surface model associated with previously selected one or more sets of parameter values;

(i) repeating parts (c), (d), (e), (f), (g), and (h) using successively selected additional sets of parameter values to update the geometric approximation and the response surface model until the finishing condition is satisfied;

(j) outputting at least one of the sets of parameter values having a predetermined cost level to a geologic model of the subsurface region; and (k) updating the geologic model, taking into account at least one of
the outputted sets of parameter values, and
the predicted outcomes associated with the outputted sets of parameter values; and wherein one of the additional sets of parameter values is selected by
evaluating a probability function having a random number output,
when the output of the probability function is greater than a predefined threshold, choosing the one of the additional sets of parameter values within a formation having an Nth best cost associated therewith, where N is a positive integer; and
when the output of the probability function is not greater than the predefined threshold, choosing the one of the additional sets of parameter values in a randomly selected formation in the geometric approximation.

12. The method of claim 11, wherein the finishing condition comprises one of
the cost associated with any of the sets of parameter values is less than a minimum cost or greater than a maximum cost, and
a predetermined number of additional sets of parameter values have been selected.

13. The method of claim 11, wherein the geometric approximation is a Voronoi tessellation, and wherein the plurality of formations include polytopes, and a cost function associated with the formation comprises a linear model based on the associated cost and the gradient of the cost.

14. The method of claim 11, wherein the geometric approximation is a Delaunay triangulation, and wherein the plurality of formations includes hypertriangles, and wherein a cost function in the formation comprises a function based on costs and gradients of the costs at vertices of the hypertriangles.

15. The method of claim 11, wherein at least one of the additional sets of parameter values is selected within one of the one or more formations having a better cost, as evaluated at the parameter set associated therewith, than costs associated with other formations in the geometric approximation.

16. The method of claim 15, wherein at least one of the additional sets of parameter values is selected taking into account the gradient of the cost of the formation having the better cost.

17. The method of claim 11, wherein at least one of the additional sets of parameter values are selected by choosing one of the one or more sets of parameter values having a better cost, as evaluated at the set of parameter values associated therewith, than other formations in the geometric approximation.

18. The method of claim 11, wherein at least one of the additional sets of parameter values are selected by choosing a set of parameter values within one of the one or more formations having an Nth best cost associated therewith, where N is a positive integer.

19. The method of claim 11, wherein selecting one of the additional sets of parameter values comprises:
performing a random walk within a formation having a better cost, as evaluated at the set of parameter values associated therewith, than other formations in the geometric approximation, the random walk being biased by the cost and gradient of the cost associated with the formation.

20. The method of claim 11, wherein at least some of the selected sets of parameter values are selected based on best estimates of sets of parameter values having better costs than other sets of parameter values.

21. The method of claim 11, wherein at least some of the selected sets of parameter values are selected randomly.

22. A computer program product having computer executable logic recorded on a tangible, non-transitory machine-readable medium, the computer program product comprising:
(a) code for selecting one or more sets of parameter values, each parameter representing a geologic property of a subsurface region;
(b) code for inputting each of the one or more sets of parameter values into a numerical model to produce a predicted outcome for each of the one or more sets of parameter values;
(c) code for comparing the predicted outcome for each of the one or more sets of parameter values with observations of the subsurface region, the difference therebetween defined as a cost associated with each of the one or more sets of parameter values;
(d) code for obtaining a gradient of the cost associated with each of the one or more sets of parameter values;
(e) code for constructing a geometric approximation of a parameter space defined by one or more formations, each of the one or more formations corresponding to a set of parameter values for which cost and the gradient of the cost have been evaluated;
(f) code for generating a response surface model based on the geometric approximation, the response surface model expressing the cost and the gradient of the cost associated with each of the one or more formations;
(g) code for selecting at least one additional set of parameter values based at least in part on the response surface model associated with previously selected sets of parameter values, said code for selecting an additional set of parameter values being performed when a finishing condition is not satisfied;
(h) code for repeating parts (b), (c), (d), (e), (f) and (g) using successively selected additional sets of parameter values to update the geometric approximation and the response surface model until the finishing condition is satisfied; and
(i) code for outputting at least one of the sets of parameter values having a predetermined level of cost to a geologic model of the subsurface region; and
wherein one of the additional sets of parameter values is selected by
evaluating a probability function having a random number output,
when the output of the probability function is greater than a predefined threshold, choosing the one of the additional sets of parameter values within a formation having an Nth best cost associated therewith, where N is a positive integer; and
when the output of the probability function is not greater than the predefined threshold, choosing the one of the additional sets of parameter values in a randomly selected formation in the geometric approximation.

23. The computer program product of claim 22, further comprising:
(j) code for updating the geologic model using at least one of the outputted sets of parameter values.

24. A method of managing hydrocarbons in a subsurface region, comprising:
(a) selecting one or more sets of parameter values, each parameter representing a geologic property;
(b) inputting each of the one or more sets of parameter values into a numerical model to produce a predicted outcome for each of the one or more sets of parameter values;
(c) comparing the predicted outcome for each of the one or more sets of parameter values with observations of the subsurface region, the difference therebetween defined as a cost associated with each of the one or more sets of parameter values;
(d) obtaining a gradient of the cost associated with each of the one or more sets of parameter values;
(e) constructing a geometric approximation of a parameter space defined by one or more formations, each of the one or more formations corresponding to a set of parameter values for which cost and the gradient of the cost have been evaluated;
(f) generating a response surface model based on the geometric approximation, the response surface model expressing the cost and the gradient of the cost associated with each of the one or more formations;
(g) when a finishing condition is not satisfied, selecting at least one additional set of parameter values based at least in part on the response surface model associated with previously selected sets of parameter values;
(h) repeating parts (b), (c), (d), (e), (f) and (g) using successively selected additional sets of parameter values to update the geometric approximation and the response surface model until the finishing condition is satisfied;

(i) predicting at least one of a presence and a location of hydrocarbons in the subsurface region using at least one of
- at least one of the sets of parameter values having a predetermined level of cost, and
- the predicted outcome associated with at least one of the sets of parameter values; and (j) managing hydrocarbons in the subsurface region; and wherein one of the additional sets of parameter values is selected by
- evaluating a probability function having a random number output,
- when the output of the probability function is greater than a predefined threshold, choosing the one of the additional sets of parameter values within a formation having an Nth best cost associated therewith, where N is a positive integer; and
- when the output of the probability function is not greater than the predefined threshold, choosing the one of the additional sets of parameter values in a randomly selected formation in the geometric approximation.

25. The method of claim 11, wherein the geologic properties include at least one of permeability and porosity.

* * * * *